(12) United States Patent
Hatano et al.

(10) Patent No.: US 11,792,040 B2
(45) Date of Patent: Oct. 17, 2023

(54) COMMUNICATION SYSTEM AND CONTROL METHOD

(71) Applicant: NIPPON TELEGRAPH AND TELEPHONE CORPORATION, Tokyo (JP)

(72) Inventors: Tomoya Hatano, Musashino (JP); Takumi Harada, Tokyo (JP); Hiroo Suzuki, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 177 days.

(21) Appl. No.: 17/604,546

(22) PCT Filed: Apr. 23, 2019

(86) PCT No.: PCT/JP2019/017223
§ 371 (c)(1),
(2) Date: Oct. 18, 2021

(87) PCT Pub. No.: WO2020/217312
PCT Pub. Date: Oct. 29, 2020

(65) Prior Publication Data
US 2022/0209988 A1 Jun. 30, 2022

(51) Int. Cl.
*H04L 12/46* (2006.01)
(52) U.S. Cl.
CPC ...... *H04L 12/4604* (2013.01); *H04L 12/4645* (2013.01); *H04L 2012/4629* (2013.01)
(58) Field of Classification Search
CPC ............. H04L 12/4604; H04L 12/4645; H04L 2012/4629; H04L 12/12
See application file for complete search history.

(56) References Cited

U.S. PATENT DOCUMENTS 6,104,696 A * 8/2000 Kadambi ............... H04L 69/16
370/399
6,687,758 B2 * 2/2004 Craft ....................... H04L 45/00
709/250

(Continued)

FOREIGN PATENT DOCUMENTS

JP 2014007511 A 1/2014

OTHER PUBLICATIONS

"Technical Basic Course [GE-PON Technology], 1st What is PON?", Nippon Telegraph and Telephone Corporation, NTT Technology Journal, Aug. 2005, pp. 71 to 74.

*Primary Examiner* — Abdullahi E Salad
(74) *Attorney, Agent, or Firm* — Harness, Dickey & Pierce, P.L.C.

(57) ABSTRACT

A communication system is a communication system connected to an upper network and a lower network, and includes at least one intermediate communication device including a plurality of upper ports for inputting and outputting optical signals to and from the upper network, and a plurality of lower ports for inputting and outputting optical signals to and from the lower network, the intermediate communication device being configured to relay communication between the upper network and the lower network, a switching device that is connected to the upper and lower networks and the plurality of upper and lower ports, switches a connection between the upper network and the plurality of upper ports, and switches a connection between the lower network and a plurality of lower ports, and a control device that outputs, to the switching device, an instruction to switch the connection by the switching device according to a communication status between the upper network and the lower network.

16 Claims, 22 Drawing Sheets

(56) References Cited

U.S. PATENT DOCUMENTS

| | | | |
|---|---|---|---|
| 10,334,059 B2* | 6/2019 | Lida | H04L 69/22 |
| 10,341,263 B2* | 7/2019 | Zou | H04L 45/302 |
| 10,742,514 B2* | 8/2020 | Voigt | H04L 41/08 |
| 2008/0068985 A1* | 3/2008 | Mieno | H04L 12/66 |
| | | | 370/217 |

* cited by examiner

| SWITCHING DEVICE WIRING INFORMATION | |
|---|---|
| PHYSICAL PORT NUMBER | PHYSICAL PORT NUMBER |
| #11 | #21 |
| #12 | #22 |
| #41 | #23 |
| #42 | #24 |

| ALLOCATION INFORMATION | | | |
|---|---|---|---|
| COMMUNICATION DEVICE INFORMATION | | COMMUNICATION DEVICE INFORMATION | |
| IDENTIFICATION INFORMATION SERIAL NUMBER | COMMUNICATION PORT NUMBER | COMMUNICATION PORT NUMBER | IDENTIFICATION INFORMATION SERIAL NUMBER |
| AAAA UPPER COMMUNICATION DEVICE #A | #1 | #1 | BBBB INTERMEDIATE COMMUNICATION DEVICE #B |
| | #2 | #2 | |
| CCCC LOWER COMMUNICATION DEVICE #C | #1 | #3 | |
| | #2 | #4 | |

| PHYSICAL WIRING INFORMATION | | |
|---|---|---|
| SWITCHING DEVICE INFORMATION | COMMUNICATION DEVICE INFORMATION | |
| PHYSICAL PORT NUMBER | COMMUNICATION PORT NUMBER | IDENTIFICATION INFORMATION SERIAL NUMBER |
| #11 | #1 | AAAA UPPER COMMUNICATION DEVICE #A |
| #12 | #2 | |
| #21 | #1 | BBBB INTERMEDIATE COMMUNICATION DEVICE #B |
| #22 | #2 | |
| #23 | #3 | |
| #24 | #4 | |
| #31 | #1 | DDDD INTERMEDIATE COMMUNICATION DEVICE #D |
| #32 | #2 | |
| #33 | #3 | |
| #34 | #4 | |
| #41 | #1 | CCCC LOWER COMMUNICATION DEVICE #C |
| #42 | #2 | |

| UPDATED ALLOCATION INFORMATION | | | |
|---|---|---|---|
| COMMUNICATION DEVICE INFORMATION | | COMMUNICATION DEVICE INFORMATION | |
| IDENTIFICATION INFORMATION SERIAL NUMBER | COMMUNICATION PORT NUMBER | COMMUNICATION PORT NUMBER | IDENTIFICATION INFORMATION SERIAL NUMBER |
| AAAA UPPER COMMUNICATION DEVICE #A | #1 | #1 | DDDD INTERMEDIATE COMMUNICATION DEVICE #D |
| | #2 | #2 | |
| CCCC LOWER COMMUNICATION DEVICE #C | #1 | #3 | |
| | #2 | #4 | |

Fig. 15

| SWITCHING DEVICE WIRING INFORMATION | |
|---|---|
| PHYSICAL PORT NUMBER | PHYSICAL PORT NUMBER |
| #11 | #31 |
| #12 | #32 |
| #41 | #33 |
| #42 | #34 |

Fig. 16

| SETTING CHANGE INFORMATION | | | |
|---|---|---|---|
| INTERMEDIATE COMMUNICATION DEVICE OF CONNECTION DESTINATION AFTER CHANGE | | INTERMEDIATE COMMUNICATION DEVICE OF CONNECTION DESTINATION BEFORE CHANGE | |
| IDENTIFICATION INFORMATION SERIAL NUMBER | COMMUNICATION PORT NUMBER | IDENTIFICATION INFORMATION SERIAL NUMBER | COMMUNICATION PORT NUMBER |
| DDDD INTERMEDIATE COMMUNICATION DEVICE #D | #1 | BBBB INTERMEDIATE COMMUNICATION DEVICE #B | #1 |
| | #2 | | #2 |
| | #3 | | #3 |
| | #4 | | #4 |

Fig. 17

| SWITCHING DEVICE WIRING INFORMATION ||
|---|---|
| PHYSICAL PORT NUMBER | PHYSICAL PORT NUMBER |
| #5 | #11 |
| #6 | #12 |
| #7 | #13 |
| #21 | #35 |
| #22 | #36 |
| #23 | #37 |

Fig. 19

| PHYSICAL WIRING INFORMATION | | | | | |
|---|---|---|---|---|---|
| PHYSICAL PORT NUMBER | COMMUNICATION DEVICE INFORMATION | | PHYSICAL PORT NUMBER | COMMUNICATION DEVICE INFORMATION | |
| | IDENTIFICATION INFORMATION SERIAL NUMBER | COMMUNICATION PORT NUMBER | | IDENTIFICATION INFORMATION SERIAL NUMBER | COMMUNICATION PORT NUMBER |
| #1 | | | #21 | BBBB | #5 |
| #2 | | | #22 | BBBB | #6 |
| #3 | | | #23 | BBBB | #7 |
| #4 | | | #24 | BBBB | #8 |
| #5 | AAAA | #5 | #25 | DDDD | #5 |
| #6 | AAAA | #6 | #26 | DDDD | #6 |
| #7 | AAAA | #7 | #27 | EEEE | #5 |
| #8 | | | #28 | EEEE | #6 |
| #9 | | | #29 | EEEE | #7 |
| #10 | | | #30 | | |
| #11 | BBBB | #1 | #31 | | |
| #12 | BBBB | #2 | #32 | | |
| #13 | BBBB | #3 | #33 | | |
| #14 | BBBB | #4 | #34 | | |
| #15 | DDDD | #1 | #35 | CCCC | #1 |
| #16 | DDDD | #2 | #36 | CCCC | #2 |
| #17 | EEEE | #1 | #37 | CCCC | #3 |
| #18 | EEEE | #2 | #38 | | |
| #19 | EEEE | #3 | #39 | | |
| #20 | | | #40 | | |

| INTEGRATED WIRING INFORMATION | | | | | | | |
|---|---|---|---|---|---|---|---|
| PHYSICAL PORT NUMBER | CONNECTION DESTINATION PHYSICAL PORT NUMBER | COMMUNICATION DEVICE INFORMATION | | PHYSICAL PORT NUMBER | CONNECTION DESTINATION PHYSICAL PORT NUMBER | COMMUNICATION DEVICE INFORMATION | |
| | | IDENTIFICATION INFORMATION SERIAL NUMBER | COMMUNICATION PORT NUMBER | | | IDENTIFICATION INFORMATION SERIAL NUMBER | COMMUNICATION PORT NUMBER |
| #1 | | | | #21 | #35 | BBBB | #5 |
| #2 | | | | #22 | #36 | BBBB | #6 |
| #3 | | | | #23 | #37 | BBBB | #7 |
| #4 | | | | #24 | | BBBB | #8 |
| #5 | #11 | AAAA | #5 | #25 | | DDDD | #5 |
| #6 | #12 | AAAA | #6 | #26 | | DDDD | #6 |
| #7 | #13 | AAAA | #7 | #27 | | EEEE | #5 |
| #8 | | | | #28 | | EEEE | #6 |
| #9 | | | | #29 | | EEEE | #7 |
| #10 | | | | #30 | | | |
| #11 | #5 | BBBB | #1 | #31 | | | |
| #12 | #6 | BBBB | #2 | #32 | | | |
| #13 | #7 | BBBB | #3 | #33 | | | |
| #14 | | BBBB | #4 | #34 | | | |
| #15 | | DDDD | #1 | #35 | #21 | CCCC | #1 |
| #16 | | DDDD | #2 | #36 | #22 | CCCC | #2 |
| #17 | | EEEE | #1 | #37 | #23 | CCCC | #3 |
| #18 | | EEEE | #2 | #38 | | | |
| #19 | | EEEE | #3 | #39 | | | |
| #20 | | | | #40 | | | |

| ALLOCATION INFORMATION | | | |
|---|---|---|---|
| COMMUNICATION DEVICE INFORMATION | | COMMUNICATION DEVICE INFORMATION | |
| IDENTIFICATION INFORMATION SERIAL NUMBER | COMMUNICATION PORT NUMBER | COMMUNICATION PORT NUMBER | IDENTIFICATION INFORMATION SERIAL NUMBER |
| AAAA | #5 | #1 | BBBB |
| AAAA | #6 | #2 | BBBB |
| AAAA | #7 | #3 | BBBB |
| BBBB | #5 | #1 | CCCC |
| BBBB | #6 | #2 | CCCC |
| BBBB | #7 | #3 | CCCC |

| UPDATED ALLOCATION INFORMATION | | | |
|---|---|---|---|
| COMMUNICATION DEVICE INFORMATION | | COMMUNICATION DEVICE INFORMATION | |
| IDENTIFICATION INFORMATION SERIAL NUMBER | COMMUNICATION PORT NUMBER | COMMUNICATION PORT NUMBER | IDENTIFICATION INFORMATION SERIAL NUMBER |
| AAAA | #5 | #1 | BBBB |
| AAAA | #6 | #2 | BBBB |
| AAAA | #7 | <u>#4</u> | BBBB |
| BBBB | #5 | #1 | CCCC |
| BBBB | #6 | #2 | CCCC |
| BBBB | #7 | #3 | CCCC |

CHANGE

Fig. 24

| ALLOCATION INFORMATION | | | |
|---|---|---|---|
| COMMUNICATION DEVICE INFORMATION | | COMMUNICATION DEVICE INFORMATION | |
| IDENTIFICATION INFORMATION SERIAL NUMBER | COMMUNICATION PORT NUMBER | COMMUNICATION PORT NUMBER | IDENTIFICATION INFORMATION SERIAL NUMBER |
| AAAA | #5 | #1 | BBBB |
| AAAA | #6 | #2 | BBBB |
| AAAA | #7 | #3 | BBBB |
| BBBB | #5 | #1 | CCCC |
| BBBB | #6 | #2 | CCCC |
| BBBB | #7 | #3 | CCCC |

| UPDATED ALLOCATION INFORMATION | | | |
|---|---|---|---|
| COMMUNICATION DEVICE INFORMATION | | COMMUNICATION DEVICE INFORMATION | |
| IDENTIFICATION INFORMATION SERIAL NUMBER | COMMUNICATION PORT NUMBER | COMMUNICATION PORT NUMBER | IDENTIFICATION INFORMATION SERIAL NUMBER |
| AAAA | #5 | #1 | EEEE |
| AAAA | #6 | #2 | EEEE |
| AAAA | #7 | #3 | EEEE |
| EEEE | #5 | #1 | CCCC |
| EEEE | #6 | #2 | CCCC |
| EEEE | #7 | #3 | CCCC |

Fig. 25

COMMUNICATION SYSTEM AND CONTROL METHOD

CROSS-REFERENCE TO RELATED APPLICATIONS

This application is a 371 U.S. National Phase of International Application No. PCT/JP2019/017223 filed on Apr. 23, 2019. The entire disclosure of the above application is incorporated herein by reference.

TECHNICAL FIELD

The present disclosure relates to a communication system and a control method.

BACKGROUND ART

In an optical communication network, redundancy of communication ports, packages, and devices is performed in preparation for a case in which the communication ports, the packages, and the devices that perform communication fail or a ease in which the packages and devices are updated or replaced. When a failure occurs or the devices are updated or replaced, the optical communication network switches the communication ports, the packages, and the devices used for communication using a communication protocol or a communication control scheme so that the communication is continued, Specific examples of a redundancy and communication control scheme are as follows. In layer 2 protocol, link aggregation is widely used as a route redundancy, device redundancy, and package redundancy scheme. A spanning tree protocol is widely used as a device redundancy and device redundancy scheme.

While the above-described redundancy is widespread, the redundancy is often not applied in an access section in which a device installed on the side of a user who uses an optical communication network is connected to an accommodation device accommodating the device. This is because the number of communication ports, packages, and devices that are redundancy targets is very large in the access section, and a cost of redundancy is high. In the access section in which redundancy is not applied, when a failure occurs or a package or device is updated or replaced, an engineer goes to a site to deal with the failure, update or replacement.

In an optical communication network that is not redundant, an engineer needs to go to the site to deal with a failure, update, or replacement, which is one factor that increases a cost required for operation of a communication system. Further, communication interruption continues until the engineer completes dealing with the failure, update, or replacement at the site, which is one factor that reduces convenience for users.

CITATION LIST

Non Patent Document

Non Patent Document 1: "Basic Technology Course [GE-PON] Part 1, What is PON," Nippon Telegraph and Telephone Corporation, NTT Technical Journal, August 2005, pp. 71-74

SUMMARY OF THE INVENTION

Technical Problem

In view of the above circumstances, an object of the present disclosure is to provide a communication system and a control method capable of shortening a period of time in which communication is not possible while reducing a cost required for an operation.

Means for Solving the Problem

A communication system of a first aspect of the present disclosure is a communication system connected to an upper network and a lower network, the communication system including at least one intermediate communication device including a plurality of upper ports configured to input and output optical signals to and from the upper network, and a plurality of lower ports configured to input and output optical signals to and from the lower network, the at least one intermediate communication device being configured to relay communication between the upper network and the lower network, a switching device connected to the upper network, the lower network, the plurality of upper ports, and the plurality of lower ports, the switching device being configured to switch a connection between the upper network and the plurality of upper ports and a connection between the lower network and the plurality of lower ports, and a control device configured to output, to the switching device, an instruction to switch at least one of the connection between the upper network and the plurality of upper ports or the connection between the lower network and the plurality of lower polls according to a communication status between the upper network and the lower network.

According to a second aspect of the present disclosure, in the communication system of the first aspect, the control device performs, according to the instruction, at least one of switching for connecting the upper port not connected to the upper network among the plurality of upper ports of the at least one intermediate communication device connected to the upper network and the lower network to the upper network or switching for connecting the lower port not connected to the lower network among the plurality of lower ports of the at least one intermediate communication device connected to the upper network and the lower network to the lower network.

According to a third aspect of the present disclosure, in the communication system of the first aspect, the at least one intermediate communication device comprises a plurality of intermediate communication devices, and the control device switches, according to the instruction, an intermediate communication device of the plurality of intermediate communication devices connected to the upper network and the lower network to another intermediate communication device among the plurality of intermediate communication devices.

According to a fourth aspect of the present disclosure, in the communication system of the first aspect, the at least one intermediate communication device comprises a plurality of intermediate communication devices, and the control device disconnects the plurality of upper ports and the plurality of lower ports of an intermediate communication device of the plurality of intermediate communication devices connected to the upper network and the lower network and connects an upper port and a lower port of another intermediate communication device of the plurality of intermediate communication devices to the upper network and the lower network according to the instruction.

According to a fifth aspect of the present disclosure, in the communication system of any one of the first to fourth aspects, when the control device receives failure information indicating a failure of any of the intermediate communication device, the plurality of upper ports, and the plurality of lower ports, the control device outputs the instruction to switch a connection to the switching device.

According to a sixth aspect of the present disclosure, in the communication system of any one of the first to fourth aspects, when the control device receives a change in a request for communication between the upper network and the lower network, the control device outputs the instruction to switch a connection to the switching device.

According to a seventh aspect of the present disclosure, in the communication system of any one of the first to sixth aspects, the switching device and the control device are installed in a central office accommodating a communication line to the lower network, and the control device receives status information indicating the communication status between the upper network and the lower network from outside the central office.

According to an eighth aspect of the present disclosure, the communication system of any one of the first to seventh aspects includes a communication control device configured to change setting information indicating an operation of the intermediate communication device according to a change in connection by the switching device.

According to a ninth aspect of the present disclosure, in the communication system of any one of the first to eighth aspects, the control device outputs the instruction to switch a connection to the switching device based on switching device wiring information indicating any one or both of a connection between the upper network and the plurality of upper ports by the switching device and a connection between the lower network and the plurality of lower ports by the switching device.

According to a tenth aspect of the present disclosure, the communication system of any one of the first to eighth aspects further includes a network management unit configured to store allocation information indicating an upper port that the intermediate communication device uses for communication with the upper network and a lower port that the intermediate communication device uses for communication with the lower network, acquire, in a case in which at least one of an upper port that the intermediate communication device uses for communication with the upper network or a lower port that the intermediate communication device uses for communication with the lower network is changed, updated allocation information indicating an upper port that the intermediate communication device uses for communication with the upper network and a lower port that the intermediate communication device uses for communication with the lower network, generate connection change information including an instruction to switch at least one of a connection between the upper network and the plurality of upper ports in the switching device or a connection between the lower network and the plurality of lower ports in the switching device based on physical wiring information indicating a connection between a plurality of physical ports of the switching device and the upper network, the intermediate communication device, and the lower network, and the updated allocation information that is acquired, and output the connection change information to the switching device, and update setting information indicating an operation of the intermediate communication device based on the allocation information and the updated allocation information.

According to an eleventh aspect of the present disclosure, the communication system the tenth aspect further includes a switching destination determination unit configured to generate the updated allocation information based on switching device wiring information indicating a connection between the upper network and the plurality of upper ports by the switching device and a connection between the lower network and the plurality of lower ports by the switching device, the physical wiring information, and the communication status.

According to a twelfth aspect of the present disclosure, in the communication system of any one of the first to eleventh aspects, the upper network includes a relay device, the intermediate communication device is an accommodation device, the lower network includes an optical termination device (optical network unit (ONU)), and the switching device switches at least one of a connection between the relay device and an upper port of the accommodation device or a connection between a lower port of the accommodation device and the optical termination device.

According to a thirteenth aspect of the present disclosure, in the communication system of any one of the first to twelfth aspects, the switching device connects the plurality of upper ports of the intermediate communication device to the upper network.

According to a fourteenth aspect of the present disclosure, in the communication system of any one of the first to thirteenth aspects, the at least one intermediate communication device comprises three or more intermediate communication devices, and at least one or more intermediate communication devices among the three or more intermediate communication devices are included as standby devices not connected to the upper network and the lower network.

A control method according to a fifteenth aspect of the present disclosure is a control method in a communication system including at least one intermediate communication device including a plurality of upper ports configured to input and output optical signals to and from an upper network, and a plurality of lower ports configured to input and output optical signals to and from a lower network, the at least one intermediate communication device being configured to relay communication between the upper network and the lower network, and a switching device connected to the upper network, the lower network, the plurality of upper ports, and the plurality of lower ports, the switching device connecting the upper network to the plurality of upper ports and connecting the lower network to the plurality of lower ports, the communication system being connected to the upper network and the lower network, the control method including outputting, by a control device, to the switching device, an instruction to switch at least one of a connection between the upper network and the plurality of upper ports or a connection between the lower network and the plurality of lower ports according to a communication status between the upper network and the lower network.

Effects of the Invention

According to the present disclosure, it is possible to shorten a period of time in which communication is not possible while reducing, a cost required for operation.

BRIEF DESCRIPTION OF DRAWINGS

FIG. 15 is a diagram illustrating an example of updated allocation information in the first embodiment.

FIG. 16 is a diagram illustrating an example of switching device wiring information in the first embodiment.

FIG. 17 is a diagram illustrating an example of setting change information in the first embodiment.

FIG. 19 is a diagram illustrating an example of switching device wiring information in the second embodiment.

FIG. 20 is a diagram illustrating an example of physical wiring information in the second embodiment.

FIG. 22 is a diagram illustrating an example of integrated wiring information in the second embodiment.

FIG. 24 is a diagram illustrating allocation information and updated allocation information in a case in which recovery is applied from a failure of a first case in the second embodiment.

FIG. 25 illustrates information indicating allocation information and updated allocation information in a case in which recovery is applied from a failure of a second case in the second embodiment.

DESCRIPTION OF EMBODIMENTS

Hereinafter, a communication system and a control method according to embodiments of the present disclosure will be described with reference to the drawings. In the following embodiments, it is assumed that the components with the same reference signs perform the same operation, and repeated description will be omitted appropriately.

First Embodiment

Figure 1:
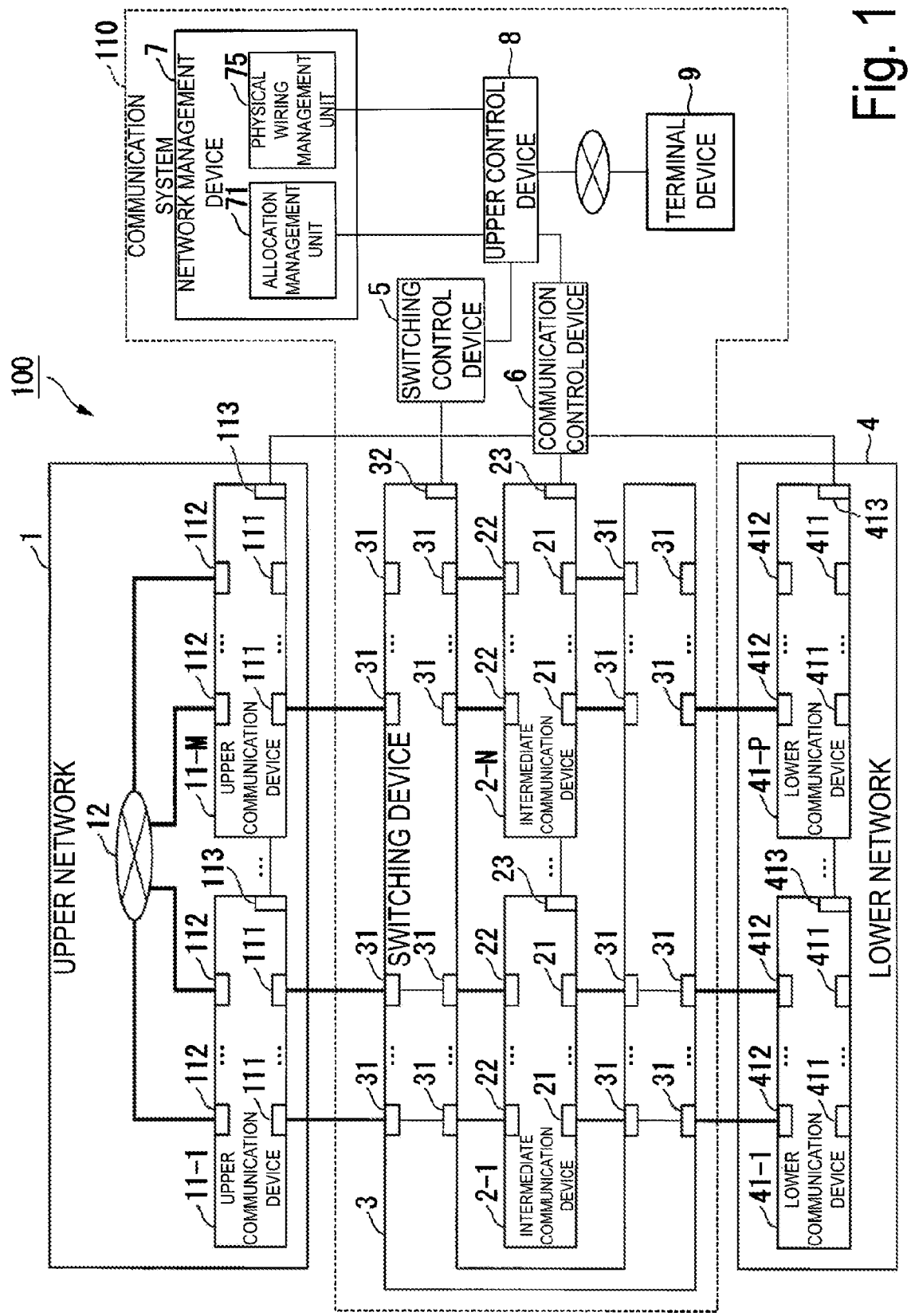
FIG. 1 is a diagram illustrating a configuration example of an optical communication network according to a first embodiment.

FIG. 1 is a diagram illustrating a configuration example of an optical communication network 100 according to a first embodiment. The optical communication network 100 includes an upper network 1, a communication system 110, and a lower network 4. The communication system 110 relays an optical signal that is used in communication between the upper network 1 and the lower network 4. The communication system 110 makes it possible to make the communication between the upper network 1 and the lower network 4 redundant and reduce an operation cost of the optical communication network 100.

For example, in the following cases, the communication system 110 is included in a central office that accommodates a communication line with a user side network, and relays communication between a backbone network and the user side network. The following cases are cases in which the upper network 1 is a network connected to the backbone network and the lower network 4 is the user side network. Further, in the following cases, the communication system 110 is included in a central office that accommodates a communication line between each antenna device (RRH) and a baseband unit (BBU) of a mobile communication system, and relays communication between the BBU and the RRH. The following cases are cases in which the upper network 1 is a network connected to the BBU and a backhaul, and the lower network 4 is a network including a plurality of RRHs. Hereinafter, in the embodiment, a case in which the communication system 110 relays the communication between the backbone network and the user side network will be described, but an application target of the communication system 110 is not limited thereto.

The upper network 1 includes a communication line 12 connected to a backbone network or another optical communication network, and M upper communication devices 11 (11-1, . . . , 11-M) connected to the communication line 12. The upper communication device 11 includes a plurality of communication ports 111, a plurality of communication ports 112, and a setting port 113. The communication ports 112 are connected to the communication line 12. The communication ports 111 are connected to the communication system 110. The setting port 113 is connected to the communication system 110 and receives device setting information. The device setting information that is supplied to the setting port 113 defines an operation of the upper communication device 11 regarding optical signal relaying and signal processing between the communication ports 112 and the communication ports 111. The upper communication device 11 relays communication between the communication line 12 and the communication system 110 based on the device setting information. The number of communication ports 111 and 112 included in the upper communication device 11 may be one.

The lower network 4 includes P lower communication devices 41 (41-1, . . . , 41-P) connected to the device on the side of the user. The lower communication device 41 includes a plurality of communication ports 411, a plurality of communication ports 412, and a setting port 413. The communication ports 412 are connected to the communication system 110. The communication ports 411 are connected to the device on the side of the user. The setting port 413 is connected to the communication system 110 and receives device setting information. The device setting information supplied to the setting port 413 defines an operation of the lower communication device 41 regarding relaying and signal processing of an optical signal between the communication ports 412 and e communication ports 411. The lower communication device 41 relays communication between the communication system 110 and the device on the side of the user based on the device setting information. The number of communication ports 411 and communication ports 412 included in the lower communication device 41 may be one.

M and P indicate the numbers of the upper communication devices 11 and the lower communication devices 41, respectively, and are integers equal to or greater than 1. The configuration example illustrated in FIG. 1 shows a case in which the numbers of upper communication devices 11 and lower communication devices 41 are two or more, but one or both of the numbers of upper communication devices 11 and lower communication devices 41 may be one.

The communication system 110 includes N intermediate communication devices 2 (2-2, . . . , 2-N), a switching device 3, a switching control device 5, a communication control device 6, a network management device 7 (network manager), an upper control device 8, and a terminal device 9. The intermediate communication device 2 includes at least one communication port 22 that is used for communication with the upper network 1, at least one communication port 21 that is used for communication with the lower network 4, and a setting port 23 via which the device setting information is input. The device setting information defines an operation of the intermediate communication device 2 regarding the relay of an optical signal between the communication port 22 and the communication port 21. The communication port 22 is also referred to as an upper port of the intermediate communication device 2. The communication port 21 is also referred to as a lower port of the intermediate communication device 2.

The intermediate communication device 2 outputs, from any of the communication ports 21, an optical signal input from the communication port 22 based on the device setting information supplied from the communication control device 6 to the setting port 23. The optical signal input from the communication port 22 may be output from one communication port 21 or may be output from a plurality of communication ports 21. For example, when the optical signal includes a signal having a plurality of wavelengths subjected to wavelength division multiplexing, the intermediate communication device 2 may output signals having respective wavelengths separated from the optical signal to a plurality of communication ports 21 based on output destinations determined for respective wavelengths in the device setting information. Further, the intermediate communication device 2 outputs an optical signal input from the communication port 21 from any of the communication ports 22 according to the device setting information. For example, when an optical signal subjected to wavelength division multiplexing is used for communication with the upper network 1, the intermediate communication device 2 combines optical signals having different wavelengths among optical signals input from the communication port 21, and outputs one optical signal obtained by combining from the communication port 22. Signal processing for the optical signals input from the communication port 21 and the communication port 22 is not limited to the above example.

At least one of the plurality of intermediate communication devices 2 includes communication ports 21 and 22 that do not relay the communication between the upper network 1 and the lower network 4 in preparation for a case in which the other intermediate communication device 2 fails or the communication ports 21 and 22 of the other intermediate communication device 2 fail. Further, in at least one of the plurality of intermediate communication devices 2, all communication ports 21 and 22 may not relay the communication between the upper network 1 and the lower network 4. Such an intermediate communication device 2 is a standby device included in preparation for failure, update, or replacement of the other intermediate communication device 2. The communication system 110 may include one or more intermediate communication devices 2 as standby devices.

The switching device 3 includes a plurality of physical ports 31 and a control port 32. Each physical port 31 is connected to any one of the communication port 111 included in the upper communication device 11, the communication ports 21 and 22 included in the intermediate communication device 2, and the communication port 412 included in the lower communication device 41. The physical port 31 includes a connector having a shape corresponding to a connector attached to an optical fiber cable, and inputs and outputs an optical signal. The switching device 3 receives control information from the switching control device 5 via the control port 32, The switching device 3 connects two physical ports among a plurality of physical ports according to control information, and enables an optical signal to be transmitted between the two physical ports. For example, the switching device 3 has a configuration in which a robot arm switches an optical fiber cable connecting a physical port 31 to another physical port 31. Alternatively, the switching device 3 has a micro-electromechanical systems (MEMS) mirror device and enables an optical signal to be transmitted between the two physical ports 31 via a controlled MEMS mirror. The present disclosure is not limited to the above example, the switching device 3 may have a configuration in which a transmission path for an optical signal can be changed by selecting a pair of two physical ports 31.

The switching control device 5 controls the switching device 3 in response to an instruction received from the upper control device 8. The instruction received from the upper control device 8 indicates that the two physical ports 31 are connected. The instruction may indicate that a plurality of pairs of physical ports 31 are connected.

The communication control device 6 supplies the device setting information to the upper communication device 11, the intermediate communication device 2, and the lower communication device 41 in response to an instruction received from the upper control device 8, and controls operations of the upper communication device 11, the intermediate communication device 2, and the lower communication devices 41. The device setting information supplied to the upper communication device 11 determines signal processing for an optical signal input from the communication port 111 and the communication port 112 of the upper communication device 11, and the communication port 111 or the communication port 112 for outputting an optical signal obtained by signal processing. Similarly, the device setting information supplied to the lower communication device 41 determines signal processing for an optical signal input from the communication port 411 and the communication port 412, and the communication port 411 or the communication port 412 for outputting an optical signal obtained by signal processing.

The network management device 7 includes an allocation management unit 71 and a physical wiring management unit 75. The allocation management unit 71 stores and updates allocation information. The allocation information includes information indicating a connection between the communication port 111 of the upper communication device 11 and the communication port 22 of the intermediate communication device 2 that are connected via the switching device 3, and information indicating a connection between the communication port 21 of the intermediate communication device 2 and the communication port 412 of the lower communication device 41 that are connected via the switching device 3. The allocation information indicates the intermediate communication device 2 and the communication ports 21 and 22 thereof allocated to the communication between the upper network 1 and the lower network 4.

The physical wiring management unit 75 stores and updates the physical wiring information. The physical wiring information includes information indicating a connection between the communication port 111 of the upper communication device 11 and the physical port 31 of the switching device 3, information indicating, a connection between the switching device 3 and the communication port 21 and the communication port 22 of the intermediate communication device 2, and information indicating a connection between the physical port. 31 of the switching device 3 and the communication port 412 of the lower communication device 41. The physical wiring information indicates a connection between the physical port 31 of the switching device 3 and each of the communication ports of the upper communication device 11, the intermediate communication device 2, and the lower communication device 41.

The upper control device 8 supplies the switching control device 5 with an instruction to switch the connection of the physical ports 31 in response to an instruction received from the terminal device 9 connected via another network. The terminal device 9 receives an input from an engineer who operates and maintains the optical communication network 100, and supplies an instruction to the upper control device 8. The terminal device 9 is provided at a place different from the central office in which the intermediate communication device 2 and the switching device 3 are installed, and the engineer operates the switching device 3 through a remote operation. The communication system 110 acquires status information on a communication status between the upper network 1 and the lower network 4 from outside the central office via the terminal device 9. The status information indicates, for example, communication interruption in the optical communication network 100, a failure of the intermediate communication device 2, a failure of the communication ports 21 and 22 of the intermediate communication device 2, or a change in a communication line provided to a user who uses the optical communication network 100.

For example, the engineer receives a notification of the failure in the intermediate communication device 2 or a notification of the communication interruption from the user who uses the optical communication network 100, and operates the switching device 3, The engineer operates the switching device 3 to switch the intermediate communication device 2 and the communication ports 21 and 22 thereof allocated to the communication, thereby achieving recovery from the failure or the communication interruption. Further, the engineer operates the switching device 3 in response to a request from the user who uses the optical communication network 100. Examples of the request from the user include changing a bandwidth of a communication line that is provided to a user, suspending the use of the communication line, and adding a new communication line. When such a request is received, the optical communication network 100 changes the intermediate communication device 2 connected to the lower communication device 41, changes the communication port 21 of the intermediate communication device 2 connected to the lower communication device 41, or increases or decreases the number of communication ports 21 connected to the lower communication device 41.

The communication system 110 switches between the intermediate communication device 2 allocated for relaying of the communication between the upper network 1 and the lower network 4 and the communication ports 21 and 22 using the switching device 3. Switching the intermediate communication device 2 or the communication ports 21 and 22 using the switching device 3 makes it possible to recover from the failure of the intermediate communication device 2 or update or replace the intermediate communication device 2 without an engineer going to the central office in which the intermediate communication device 2 is installed. The communication system 110 makes work of engineers in the central office unnecessary, and thus it is possible to reduce an operation cost of the optical communication network 100 and shorten a period of time in which communication is not possible.

Further, because the communication system 110 can freely change the intermediate communication device 2 connected to the upper network 1 and the lower network 4, it is possible to achieve redundancy of each intermediate communication device 2 even when a standby device is not provided for each intermediate communication device 2 that is used for communication. The communication system 110 includes the number of intermediate communication devices 2 corresponding to the degree of redundancy, such that a cost required for redundancy of the intermediate communication devices 2 can be reduced. Further, the communication system 110 can change the communication line that is provided to the user through connection switching in the switching device 3 in a shorter time than when an engineer goes to the central office.

Figure 2:
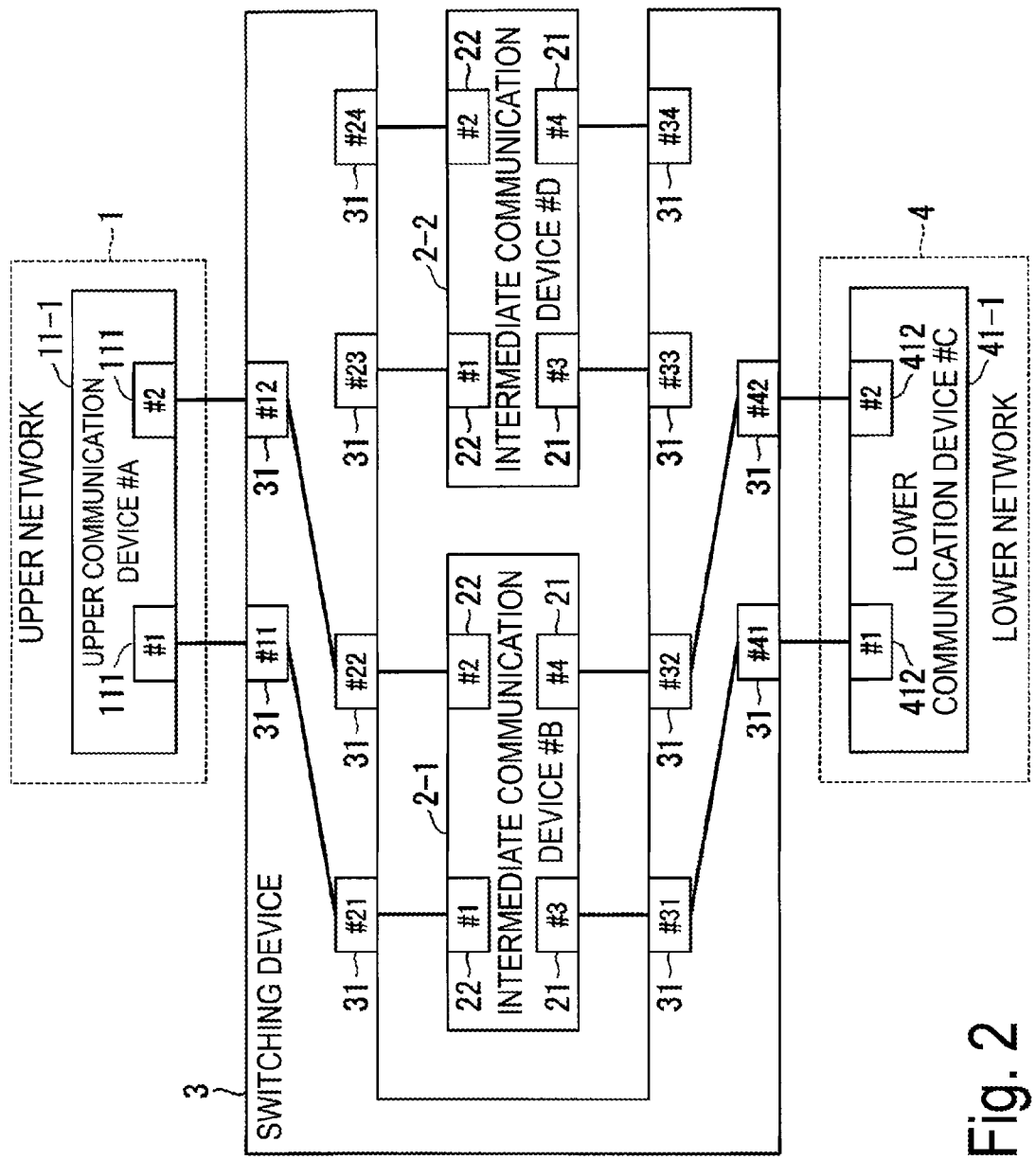
FIG. 2 is a diagram illustrating an example of a connection between a switching device and each of an upper communication device, an intermediate communication device and a lower communication device in the first embodiment.

Hereinafter, configurations of the switching control device 5, the allocation management unit 71, and the physical wiring management unit 75 will be described. Here, the connection example illustrated in FIG. 2 is used for detailed description of the connection between the switching device 3 and each of the upper communication device 11, the intermediate communication device 2, and the lower communication device 41. FIG. 2 is a diagram illustrating an example of a connection between the switching device 3 and each of the upper communication device 11, the intermediate communication device 2, and the lower communication device 41 in the first embodiment. In the connection example illustrated in FIG. 2, the upper network 1 includes an upper communication device 11-1 "#A," the communication system 110 includes an intermediate communication device 2-1 "#B" and an intermediate communication device 2-2 "#D," and the lower network 4 includes a lower communication device 41-1 "#C." Further, the upper communication device 11-1 "#A" includes two communication ports 111 "#1" and "#2." The intermediate communication devices 2-1 "#B" and 2-2 "#D" include two communication ports 22 "#1" and "#2" and two communication ports 21 "#3" and "#4." The lower communication device 41-1 "#C" includes two communication ports 412 "#1" and "#2". Communication ports and physical ports that are allocated the same name and reference sign are distinguished by a combination of "#" with a number.

Among a plurality of physical ports 31 included in the switching device 3, 12 physical ports 31 "#11," "#12," "#21," "#22," "#23," "#24," "#31," "#32," "#33," "#34," "#41" and "#42" are used for connections to the upper communication device 11, the intermediate communication device 2, and the lower communication device 41. The connection example illustrated in FIG. 2 shows the physical port 31 used for connection among the plurality of physical ports 31 included in the switching device 3, Physical ports 31 "#11" and "#12" are connected to the communication ports 111 "#1" and "#2" of the upper communication device 11-1 "#A," respectively. Physical ports 31 "#21" and "#22" are connected to the communication ports 22 "#1" and "#2" of the intermediate communication device 2-1 "#B," respectively. Physical ports 31 "#23" and "#24" are connected to the communication ports 22 "#1" and "#2" of the intermediate communication device 2-2 "#D," respectively. Physical ports 31 "#31" and "#32" are connected to the communication ports 21 "#3" and "#4" of the intermediate communication device 2-1 "#B," respectively. Physical ports 31 "#33" and "#34" are connected to the communication ports 21 "#3" and "#4" of the intermediate communication device 2-2 "#D," respectively. Physical ports 31 "#41" and "#42" are connected to the communication ports 412 "#1" and "#2" of the lower communication device 41-1 "#C," respectively.

In the switching device 3, the physical ports 31 "#11" and "#12" are connected to the physical ports 31 "#21" and "#22," respectively. The physical ports 31 "#31" and "#32" are connected to the physical ports 31 "#41" and "#42," respectively. A connection between the physical ports 31 in the switching device 3 can be switched as described above.

Figures 3, 4:
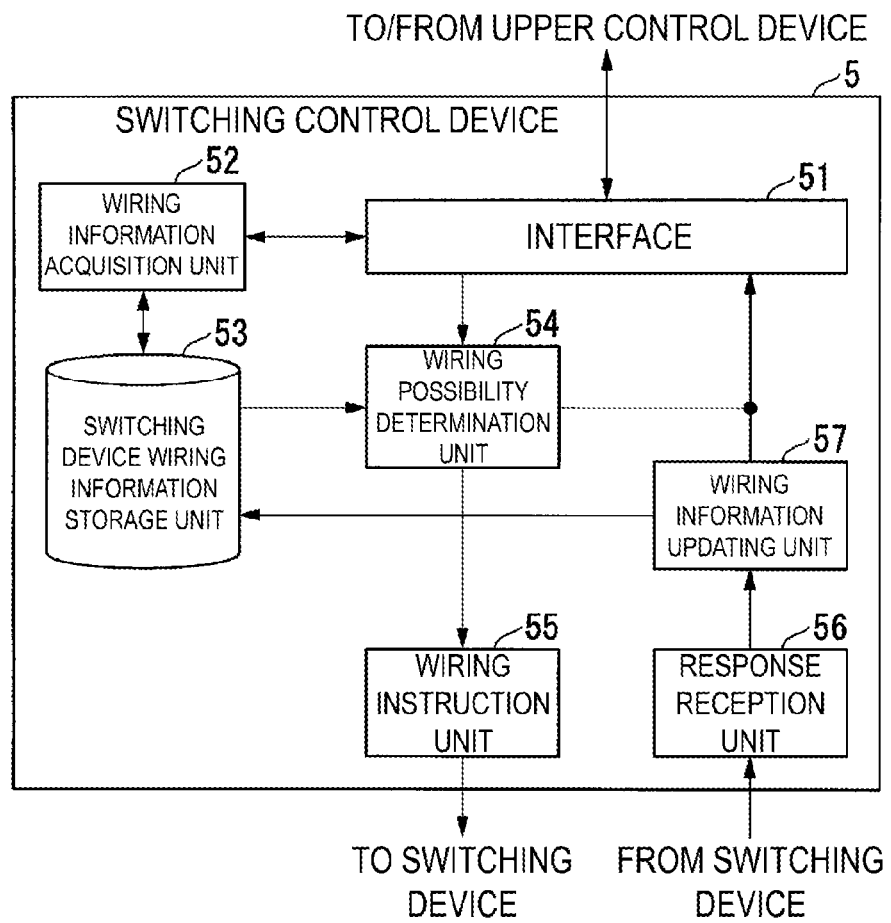
FIG. 3 is a block diagram illustrating a configuration example of a switching control device in the first embodiment.
FIG. 4 is a diagram illustrating an example of switching device wiring information in the first embodiment.

FIG. 3 is a block diagram illustrating a configuration example of the switching control device 5 according to the first embodiment. The switching control device 5 includes an interface 51, a wiring information acquisition unit 52, a switching device wiring information storage unit 53, a wiring possibility determination unit 54, a wiring instruction unit 55, a response reception unit 56, and a wiring information updating unit 57. The interface 51 performs input and output to and from the upper control device 8.

The interface 51 receives the connection change information and the request information as control information from the upper control device 8. The connection change information indicates an instruction to change the connection between the physical ports 31 in the switching device 3. The request information indicates a request for switching device wiring information stored in the switching device wiring information storage unit 53. The interface 51 notifies the upper control device 8 of a response indicating the completion or inability of the connection change based on the connection change information. Further, the interface 51 supplies the switching device wiring information to the upper control device 8 as a response to the request information.

When the interface 51 receives the request information, the wiring information acquisition unit 52 reads the switching device wiring information stored in the switching device wiring information storage unit 53, and supplies the read switching device wiring information to the interface 51.

The switching device wiring information storage unit 53 stores the switching device wiring information. The switching device wiring information indicates the connection between the physical ports 31 in the switching device 3. The switching device wiring information includes information indicating a pair of physical port numbers for identifying two connected physical ports 31. FIG. 4 is a diagram illustrating an example of switching device wiring information in the first embodiment. The switching device wiring information illustrated in FIG. 4 indicates the connection between the physical ports 31 in the connection example illustrated in FIG. 2. The switching device wiring information illustrated in FIG. 4 includes a pair of physical port numbers "#11" and "#21," and indicates that the physical ports 31 indicated by the physical port numbers are connected. Similarly, the switching device wiring information indicates that the physical ports 31 "#12" and "#22" are connected, that the physical ports 31 "#41" and "#23" are connected, and that the physical ports 31 "#42" and "#24" are connected. The switching device wiring information may be divided into upper wiring information indicating a pair of physical port numbers regarding a connection between the upper network 1 and the communication port 22, and lower wiring information indicating a pair of physical port numbers regarding a connection between the lower network 4 and the communication port 22.

When the interface 51 receives the connection change information, the wiring possibility determination unit 54 determines whether the connection change indicated by the connection change information is possible based on the switching device wiring information. When the connection change is possible, the wiring possibility determination unit 54 supplies the connection change information to the wiring instruction unit 55. When the connection destination change is not possible, the wiring possibility determination unit 54 notifies the interface 51 of a response indicating that the connection change is not possible. For example, when the connection change information indicates a change instruction to connect the physical port 31 "#23" to the physical port 31 "#12" already connected to the physical port 31 "#22," the wiring possibility determination unit 54 determines that a plurality of physical ports cannot be connected to the physical port 31 "#12" and determines that the connection is not possible. In this case, the wiring possibility determination unit 54 supplies the interface 51 with a response indicating that the connection change is not possible.

The wiring instruction unit 55 supplies a connection change instruction based on the connection change information to the control port 32 of the switching device 3. The response reception unit 56 receives a response indicating the completion of the connection change according to the connection change information from the control port 32 of the switching device 3, When the response reception unit 56 receives the response indicating the completion of the connection change, the response reception unit 56 notifies the wiring information updating unit 57 of the reception of the response. The wiring information updating unit 57 updates the switching device wiring information according to the connection change indicated by the connection change information. When the wiring information updating unit 57 ends updating the switching device wiring information, the wiring information updating unit 57 notifies the interface 51 of a response indicating the completion of the connection change based on the connection change information. In response to the notification, the interface 51 supplies a response indicating the completion of the connection change based on the connection change information to the upper control device 8.

Figures 5, 6:
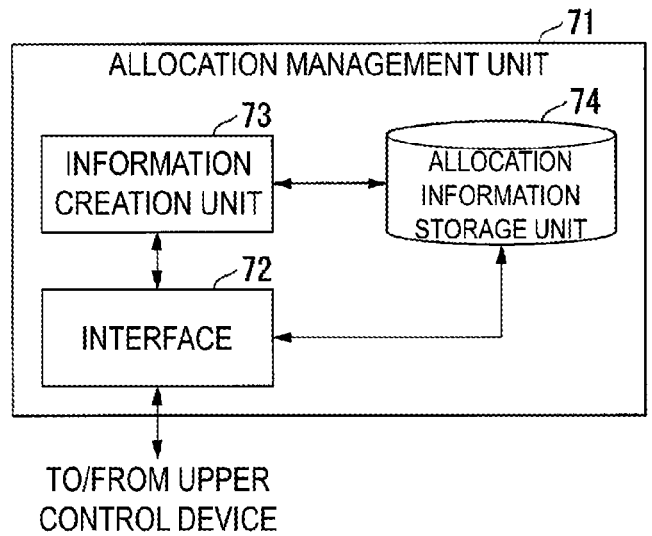
FIG. 5 is a block diagram illustrating a configuration example of an allocation management unit according to the first embodiment.
FIG. 6 is a diagram illustrating an example of allocation information in the first embodiment.

FIG. 5 is a block diagram illustrating a configuration example of the allocation management unit 71 according to the first embodiment. The allocation management unit 71 includes an interface 72, an information creation unit 73, and an allocation information storage unit 74. The interface 72 receives an instruction for a request for or update of allocation information from the upper control device 8. When the interface 72 receives the instruction for a request for the allocation information, the interface 72 reads the allocation information stored in the allocation information storage unit 74, and supplies the read allocation information to the upper control device 8.

When the interface 72 receives an instruction to update the allocation information, the interface 72 notifies the information creation unit 73 of the instruction to update the allocation information. When the information creation unit 73 receives the instruction to update the allocation information, the information creation unit 73 requests the upper control device 8 to provide the switching device wiring information and the physical wiring information via the interface 72. The interface 72 supplies the switching device wiring information and the physical wiring information received as a response to the request to the information creation unit 73. The information creation unit 73 creates allocation information based on the switching device wiring information and the physical wiring information, and updates the allocation information stored in the allocation information storage unit 74 with the created allocation information.

FIG. 6 is a diagram illustrating an example of allocation information in the first embodiment. The allocation information includes communication device information on each of the upper communication device 11, the intermediate communication device 2, and the lower communication device 41 included in the optical communication network 100. The communication device information includes identification information for identifying each of the upper communication device 11, the intermediate communication device 2, and the lower communication device 41, and a communication port number for identifying each of the communication ports of these devices. That is, the communication device information uniquely specifies the communication port in the communication system 110. Further, the allocation information indicates the intermediate communication device 2 and the communication ports 21 and 22 thereof allocated to the communication between the upper network 1 and the lower network 4.

In the allocation information illustrated in FIG. 6, serial numbers "AAAA", "BBBB", and "CCCC" of the devices are used as identification information of the upper communication device 11-1 "#A", the intermediate communication device 2-1 "#8", and the lower communication device 41-1 "#C". Further, "#1", "#2", "#3", and "#4" are used as communication port numbers indicating the communication ports of each device. Although the case in which the serial number is used as the identification information will be described, the upper communication device 11, the intermediate communication device 2, and the lower communication device 41 may be identified by using a thing other than the serial number. For example, any one or a combination of a MAC address, a host name, a device name, an IP address, and the like allocated to the upper communication device 11, the intermediate communication device 2, and the lower communication device 41 may be used as the identification information.

As illustrated in FIG. 6, the allocation information indicating the connection example illustrated in FIG. 2 indicates that the communication port 111 "#1" of the upper communication device 11-1 "#A" and the communication port 22 "#1" of the intermediate communication device 2-1 "#B" correspond to each other and indicates that these communication ports are connected. Similarly, the allocation information indicates that the communication port 111 "#2" of the upper communication device 11-1 "#A" and the communication port 22. "#2" of the intermediate communication device 2-1 "#B" are connected. Further, the allocation information indicates that the communication port 21 "#3" of the intermediate communication device 2-1 "#B" and the communication port 412 "#1" of the lower communication device 41-1 "#C" are connected and that the communication port 21 "#4" of the intermediate communication device 2-1 "#9" and the communication port 412 "#2" of the lower communication device 41-1 "#C" are connected.

Figures 7, 8:
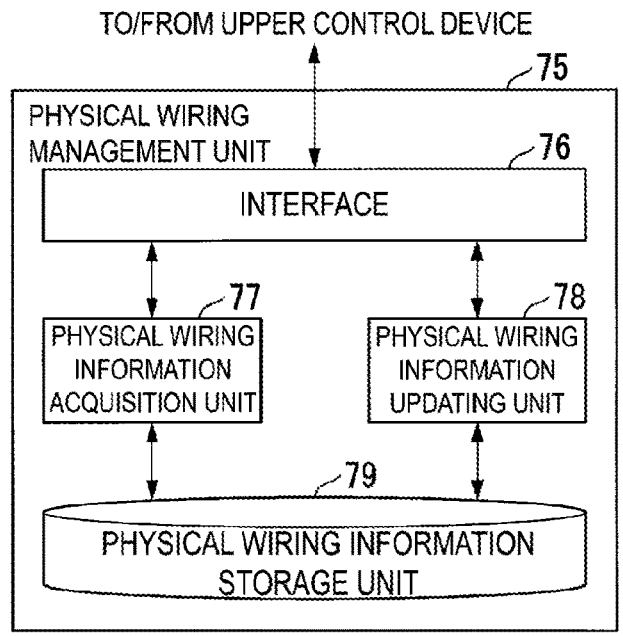
FIG. 7 is a block diagram illustrating a configuration example of a physical wiring management unit according to the first embodiment.
FIG. 8 is a diagram illustrating an example of physical wiring information according to the first embodiment.

FIG. 7 is a block diagram illustrating a configuration example of the physical wiring management unit 75 according to the first embodiment. The physical wiring management unit 75 includes an interface 76, a physical wiring information acquisition unit 77, a physical wiring information updating unit 78, and a physical wiring information storage unit 79. The interface 76 receives an instruction for a request for or update of physical wiring information from the upper control device 8. When the interface 76 receives the instruction for a request for the physical wiring information, the interface 76 notifies the physical wiring information acquisition unit 77 of the instruction. The interface 76 receives the physical wiring information from the physical wiring information acquisition unit 77 as a response to the instruction, and supplies the physical wiring information to the upper control device 8. When the interface 76 receives the instruction to update the physical wiring information, the interface 76 requests the upper control device 8 to provide the physical wiring change information. The physical wiring change information indicates a change in the connection between the switching device 3 and each of the upper communication device 11, the intermediate communication device 2, and the lower communication device 41. When the interface 76 receives the physical wiring change information, the interface 76 supplies the physical wiring change information to the physical wiring information updating unit 78.

The physical wiring information acquisition unit 77 reads the physical wiring information from the physical wiring information storage unit 79 according to the instruction from the interface 76, and supplies the read physical wiring information to the interface 76. When the physical wiring information updating unit 78 receives the physical wiring change information from the interface 76, the physical wiring information updating unit 78 updates the physical wiring information stored in the physical wiring information storage unit 79 based on the connection change indicated by the physical wiring change information.

FIG. 8 is a diagram illustrating an example of the physical wiring information in the first embodiment. The physical wiring information includes switching device information or a physical port number indicating the physical port 31 of the switching device 3, and communication device information on each of the upper communication device 11, the intermediate communication device 2, and the lower communication device 41. The physical wiring information indicates a communication port of any one of the upper communication device 11, the intermediate communication device 2, and the lower communication device 41 connected to the respective physical ports 31. When none of the communication ports of the upper communication device 11, the intermediate communication device 2, and the lower communication device 41 is connected to the physical ports 31, empty (NULL) information in the physical wiring information is associated with the physical port number of the physical port 31.

In the physical wiring information illustrated in FIG. 8, serial numbers "AAAA", "BBBB", and "CCCC" are used as the identification information of the upper communication device 11-1 "#A", the intermediate communication device 2-1 "#B", and the lower communication device 41-1 "#C", similarly to the example illustrated in FIG. 6. Further, "#1", "#2", "#3", and "#4" are used as communication port numbers indicating the communication ports of each device. Further, "#11", "#12", "#21", "#22", "#23", "#24", "#31", "#32", "#33", "#34", "#41", and "#42" are used as physical port numbers indicating the physical ports 31.

The physical wiring information indicating the connection example illustrated in FIG. 2 indicates that the physical port 31 "#11" and the communication port 111 "#1" of the upper communication device 11-1 "#A" correspond to each other and that these ports are connected, as illustrated in FIG. 8. Similarly, the physical wiring information indicates that the physical port 31 "#12" and the communication port 111 "#2" of the upper communication device 11-1 are connected. The physical wiring information indicates that the respective physical ports 31 "#21", "#22", "#23", and "#24" are connected to the communication port 22 "#1", the communication port 22 "#2", the communication port 21 "#3", and the communication port 21 "#4" of the intermediate communication device 2-1. Further, the physical wiring information indicates that the respective physical ports 31 "#31", "#32", "#33", and "#34" are connected to the communication port 22 "#1", the communication port 22 "#2", the communication port 21 "#3", and the communication port "#4" of the intermediate communication device 2-2. Further, the physical wiring information indicates that the respective physical ports 31 "#41" and "#42" are connected to the communication ports 412. "#1" and "#2" of the lower communication device 41-1.

Here, switching between the intermediate communication device 2 and the communication ports 21 and 22 that is performed by the switching device 3 in the communication system 110 will be illustrated with reference to FIGS. 9 to 13. In FIGS. 9 to 13, broken line connecting the physical ports 31 indicates a connection released by connection switching in the switching device 3. A solid line connecting the physical polls 31 indicates a connection between the physical ports 31 after the connection is switched by the switching device 3.

Figure 9:
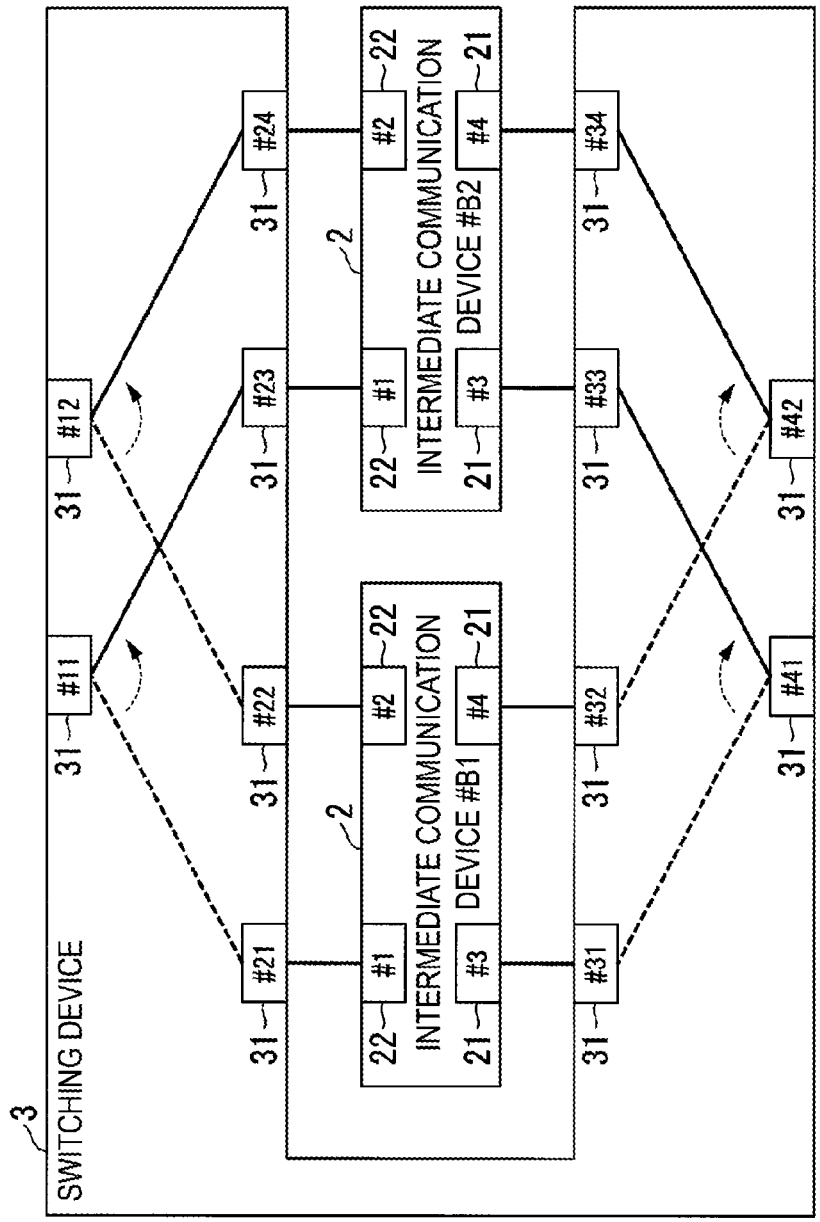
FIG. 9 is a diagram illustrating a first example of switching in the first embodiment.

FIG. 9 is a diagram illustrating a first example of switching in the first embodiment. The example illustrated in FIG. 9 shows a case in which the communication system 110 includes intermediate communication devices 2 "#B1" and "#B2" each including two communication ports 21 and two communication ports 22. Further, the example illustrated in FIG. 9 shows switching when the intermediate communication device 2 "#B1" is allocated for relaying of the communication between the upper network 1 and the lower network 4, and a failure occurs in the intermediate communication device 2 "#B1". The switching device 3 switches the intermediate communication device 2 allocated to the relay from the intermediate communication device 2 "#B1" to the intermediate communication device 2 "#B2" as a standby device. By using the intermediate communication device 2 "#B2" as a standby device, recovery from communication interruption can be achieved. In this case, the switching device 3 switches connection destinations of the physical ports 31 "#11" and "#12" connected to the upper network 1 from the physical ports 31 "#21" and "#22" to the physical ports 31 "#23" and "#24". Further, the switching device 3 switches connection destinations of the physical ports 31 "#41" and "#42" connected to the lower network 4 from the physical ports 31 "#31" and "#32" to the physical ports 31 "#33" and "#34".

Figure 10:
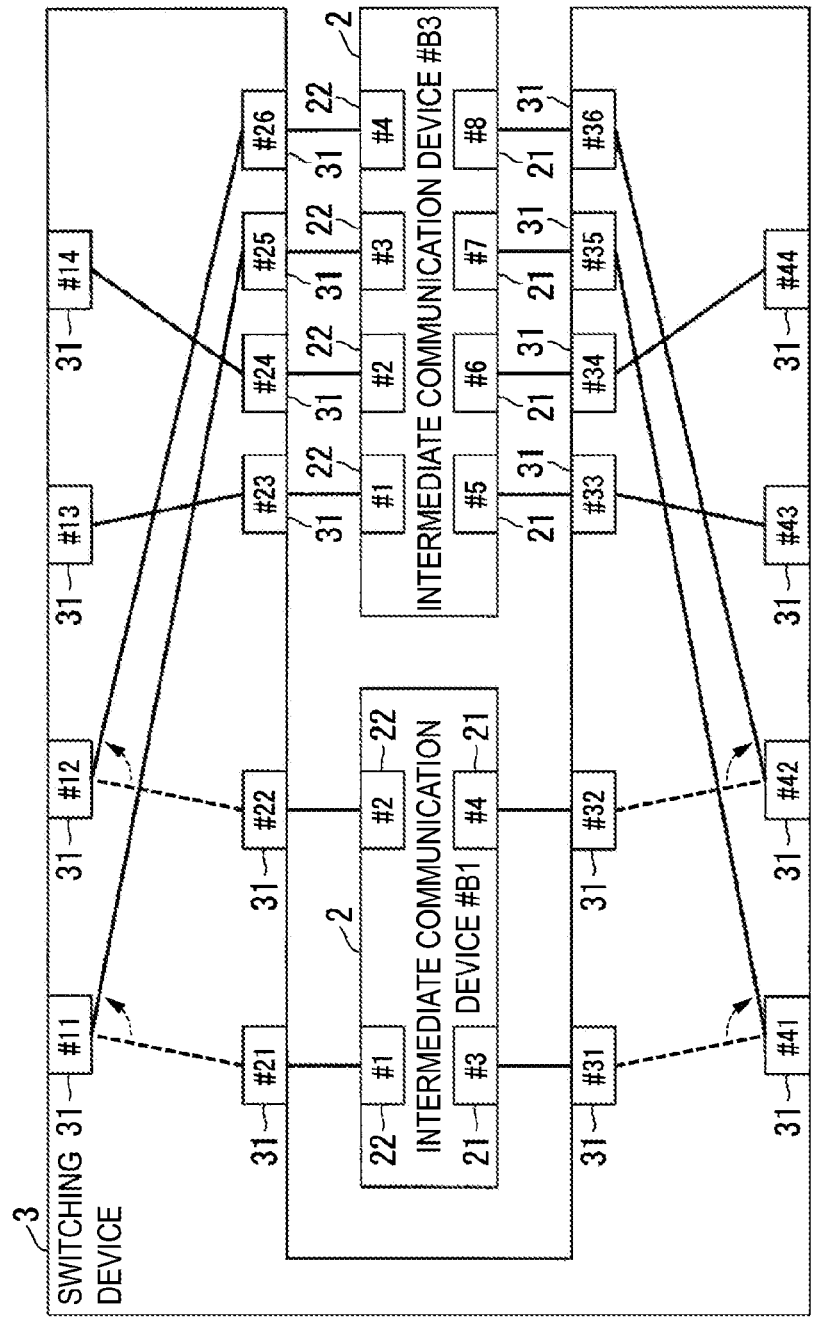
FIG. 10 is a diagram illustrating a second example of the switching in the first embodiment.

FIG. 10 is a diagram illustrating a second example of the switching in the first embodiment. The example illustrated in FIG. 10 shows a case in which the communication system 110 includes an intermediate communication device 2 "#B1" including two communication ports 21 and two communication ports 22, and an intermediate communication device 2 "#B3" including four communication ports 21 and four communication ports 22. Further, the example illustrated in FIG. 10 shows switching in a case in which the intermediate communication devices 2 "#B1" and "#B3" are allocated for relaying of the communication between the upper network 1 and the lower network 4, and a failure occurs in the intermediate communication device 2 "#B1. The switching device 3 allocates relaying allocated to the intermediate communication device 2 "#B1" to the intermediate communication device 2 "#B3". The communication ports 21 and 22 "#3", "#4", "#7", and "#8" that are not used for relaying in the intermediate communication device 2 "#B3", which has already performed relaying, are used such that recovery from communication interruption can be achieved. The communication ports 21 and 22 that are not used for relaying of communication between the upper network 1 and the lower network 4 are, referred to as standby ports. In this case, the switching device 3 switches connection destinations of the physical ports 31 "#11" and "#12" connected to the upper network 1 from the physical ports 31 "#21" and "#22" to the physical ports 31 "#24" and "#25". Further, the switching device 3 switches connection destinations of the physical ports 31 "#41" and "#42" connected to the lower network 4 from the physical ports 31 "#31" and "#32" to the physical ports 31 "#35" and "#36".

Figure 11:
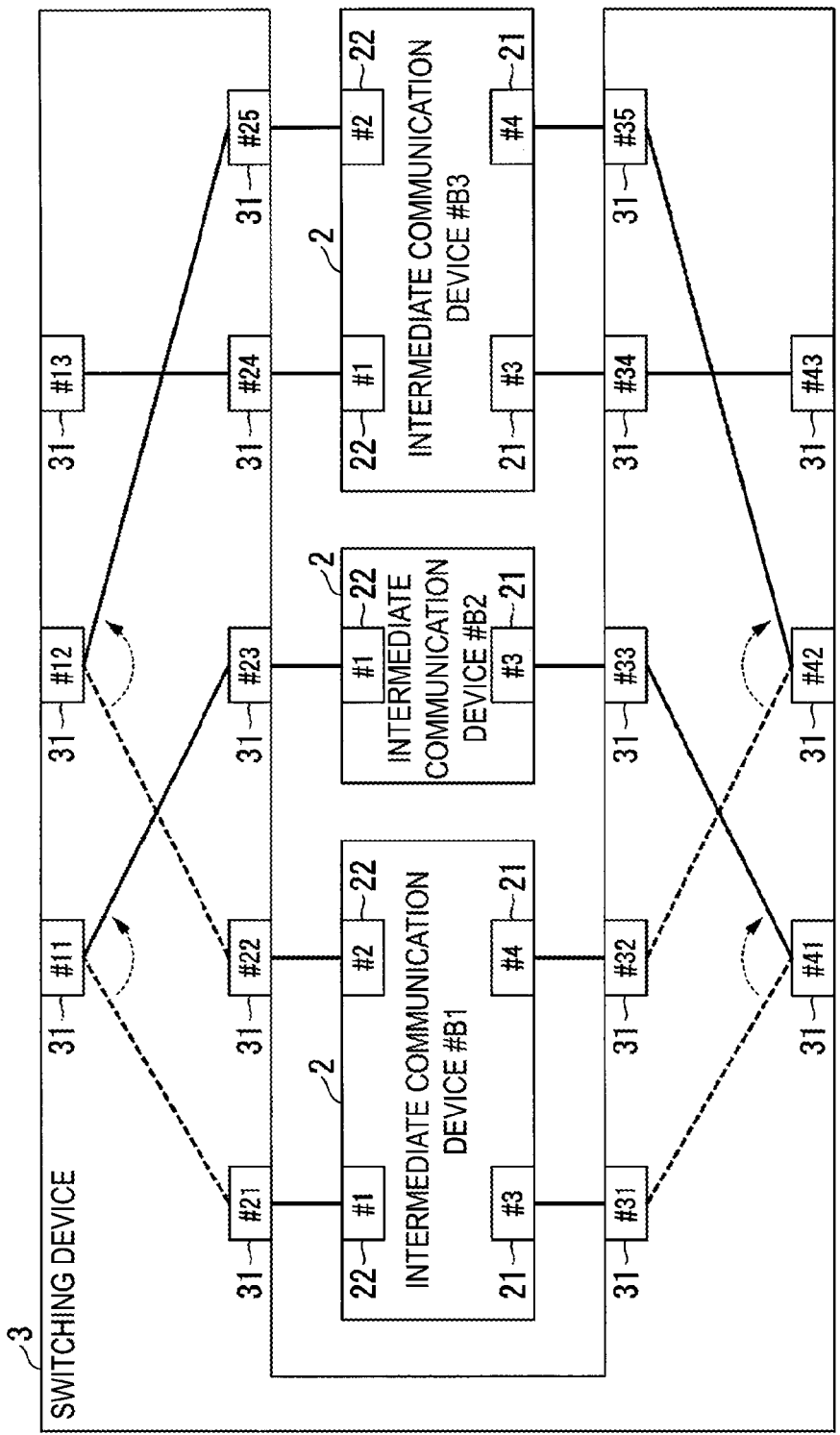
FIG. 11 is a diagram illustrating a third example of the switching in the first embodiment.

FIG. 11 is a diagram illustrating third example of the switching in the first embodiment. The example illustrated in FIG. 11 shows a ease in which the communication system 110 includes intermediate communication devices 2 "#B1" and "#B3" each including two communication ports 21 and two communication ports 22, and an intermediate communication device 2 "#B2" including one communication port 21 and one communication port 22. Further, the example illustrated in FIG. 11 shows switching in a case in which the intermediate communication devices 2 "#B1" and "#B3" are allocated for relaying of the communication between the upper network 1 and the lower network 4, and a failure occurs in the intermediate communication device 2 "#B1". The switching device 3 allocates the relay allocated to the intermediate communication device 2 "#B1" to the intermediate communication devices 2 "#B2" and "#B3". The communication port 22 "#2" and the communication port 21 "#4" (standby port) of the intermediate communication device 2 "#B3", which has already performed relaying, and intermediate communication device 2 "#B2" as a standby device are used such that recovery from communication interruption can be achieved. In this case, the switching device 3 switches connection destinations of the physical ports 31 "#11" and "#12" connected to the upper network 1 from the physical ports 31 "#21" and "#22" to the physical ports 31 "#"23" and "#25". Further, the switching device 3 switches connection destinations of the physical ports 31 "#41" and "#42" connected to the lower network 4 from the physical ports 31 "#31" and "#32" to the physical ports 31 "#33" and "#35".

Figure 12:
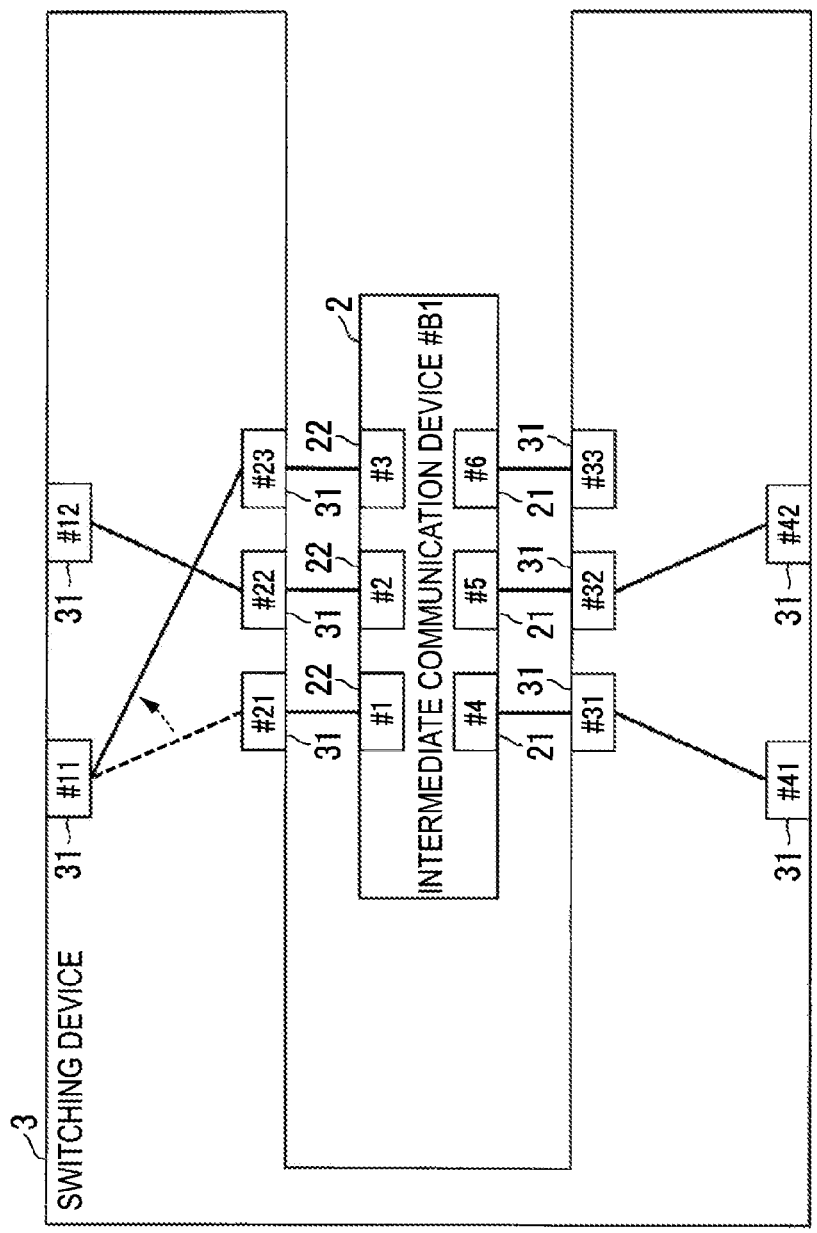
FIG. 12 is a diagram illustrating a fourth example of the switching in the first embodiment.

FIG. 12 is a diagram illustrating a fourth example of the switching in the first embodiment. The example illustrated in FIG. 12 shows a case in which the communication system 110 includes an intermediate communication device 2 "#B1" including three communication ports 21 and three communication ports 22. Further, the example illustrated in FIG. 12 shows switching in a case in which the intermediate communication device 2 "#B1" is allocated for relaying of the communication between the upper network 1 and the lower network 4 and a failure occurs in the communication port 22 "#1" of the intermediate communication device 2 "#B1". The switching device 3 allocates the relay allocated to the communication port 22 "#1" of the intermediate communication device 2 "#B1" to the communication port 22 "#3" (standby port). The communication port 22 "#3" as a standby port is used such that recovery from a communication interruption can be achieved. In this case, the switching device 3 switches the connection destination of the physical port 31 "#11" connected to the upper network 1 from the physical port 31 "#21" to the physical port 31 "#23".

Figure 13:
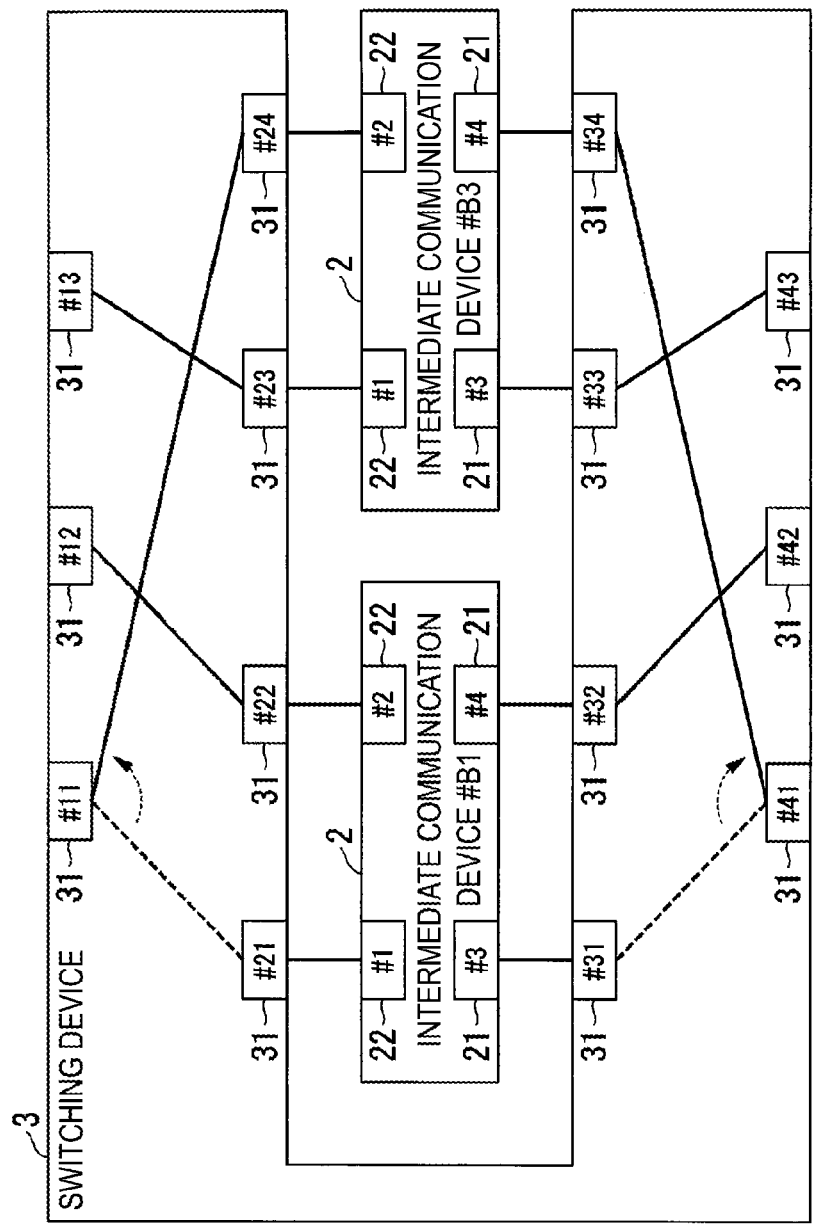
FIG. 13 is a diagram illustrating a fifth example of the switching in the first embodiment.

FIG. 13 is a diagram illustrating a fifth example of the switching in the first embodiment. The example illustrated in FIG. 13 shows a case in which the communication system 110 includes intermediate communication devices 2 "#B1" and "#B3" each including two communication ports 21 and two communication ports 22. Further, the example illustrated in FIG. 13 shows switching in a case in which the intermediate communication devices 2 "#B1" and "#B3" are allocated for relaying of the communication between the upper network 1 and the lower network 4, and a failure occurs in the communication port 22 "#1" of the intermediate communication device 2 "#B1". The switching device 3 allocates the relay allocated to the communication port 22 "#1" of the intermediate communication device 2 "#B1" to the communication port 22 "#2" of the intermediate communication device 2 "#B3". According to this switching of the allocation, the switching device 3 allocates the relay allocated to the communication port 21 "#3" of the intermediate communication device 2 "#B1" to the communication port 21 "#4" of the intermediate communication device 2 "#B3". The communication port 22 "#2" and the communication port 21 "#4" (standby port) of the intermediate communication device 2 "#B3", which has already been relayed, are used such that recovery from a communication interruption can be achieved. In this case, the switching device 3 switches the connection destination of the physical port 31 "#11" connected to the upper network 1 from the physical port 31 "#21" to the physical port 31 "#24". Further, the switching device 3 switches the connection destination of the physical port 31 "#41" connected to the lower network 4 from the physical port 31 "#31" to die physical port 31 "#34".

Hereinafter, an operation in which the communication system 110 switches the intermediate communication device 2 or the communication ports 21 and 22 that are allocated for relaying of the communication between the upper network 1 and the lower network 4 using the switching device 3 will be described. For the description of the operation, the connection example illustrated in FIG. 2 is also used.

Figure 14:
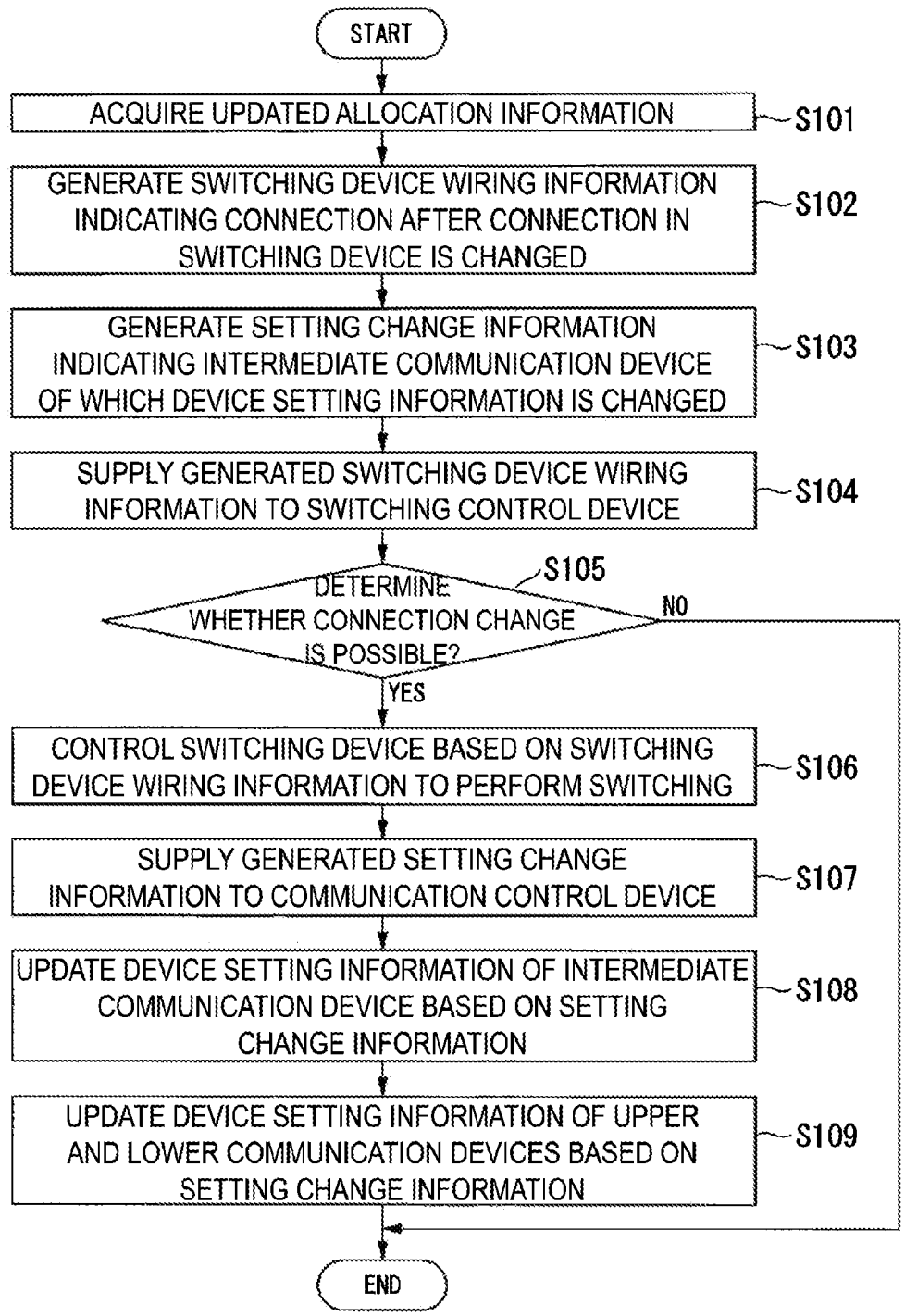
FIG. 14 is a flowchart illustrating an operation in a switching process that is performed by a communication system according to the first embodiment.

FIG. 14 is a flowchart illustrating an operation (steps S101 to S109) in a switching process that is performed by the communication system 110 in the first embodiment. Here, it is assumed that the switching device wiring information illustrated in FIG. 4, the allocation information illustrated in FIG. 6, and the physical wiring information illustrated in FIG. 8 are stored in the switching device wiring information storage unit 53, the allocation information storage unit 74, and the physical wiring information storage unit 79, respectively. When the engineer receives the notification of the failure of the intermediate communication device 2-1 "#B" or the stop of the communication relayed by the intermediate communication device 2-1 "#B", the engineer inputs the updated allocation information to the terminal device 9. The updated allocation information indicates allocation information after switching is performed from the failed intermediate communication device 2-1 "#B" to the intermediate communication device 2-2 "#D" that is a standby device. When the updated allocation information is input to the terminal device 9, the switching process for changing the connection of the physical port 31 is started.

Step S101

The upper control device 8 receives the updated allocation information from the terminal device 9 as an instruction for the switching process. The updated allocation information indicates the intermediate communication device 2 and the communication ports 21 and 22 thereof that are allocated to the communication between the upper network 1 and the lower network 4. Specifically, information indicating the communication port 22 of the intermediate communication device 2-2 "#D" connected to each communication port 111 of the upper communication device 11-1 "#A" and information indicating the communication port 21 of the intermediate communication device 2-2 "#D" connected to each communication ports 412 of the lower communication device 11-1 "#C" are included in the updated allocation information.

FIG. 15 is a diagram illustrating an example of the updated allocation information in the first embodiment. In the example of the updated allocation information illustrated in FIG. 15, communication ports to be connected are indicated as a pair of communication port numbers indicating respective communication ports. For example, the updated allocation information includes a pair of the communication port number "#1" of the communication port 111 included in the upper communication device 11-1 "#A" and the communication port number "#1" of the communication port 22 included in the intermediate communication device 2-2 "#D," and indicates that the communication port 111 "#1" and the communication port 22 "#1" are connected.

Step S102

When the upper control device 8 receives the updated allocation information, the upper control device 8 requests the physical wiring management unit 75 to provide the physical wiring information, and acquires the physical wiring information. The upper control device 8 generates switching device wiring information after the connection between the physical ports 31 in the switching device 3 is changed according to the updated allocation information. The upper control device 8 generates switching device wiring information based on the physical wiring information and the updated allocation information. The upper control device 8 acquires, from the physical wiring information, the physical port number of the physical port 31 connected to the communication port of each of the upper communication device 11-1 "#A", the intermediate communication device 2-2 "#D", and the lower communication device 41-1 "#C", which is included in the updated allocation information. The upper control device 8 determines a pair of physical port numbers of the physical port 31 corresponding to the pair of communication port numbers included in the updated allocation information using the acquired physical port number, and generates switching device wiring information.

FIG. 16 is a diagram illustrating an example of the switching device wiring information in the first embodiment. The switching device wiring information illustrated in FIG. 16 indicates the connection between the physical ports 31 after the connection between the physical ports 31 in the switching device 3 is changed according to the updated allocation information.

Step S103

The upper control device 8 requests the allocation management unit 71 to provide the allocation information and acquires the allocation information. The upper control device 8 compares the acquired allocation information with the updated allocation information and generates setting change information. The setting change information indicates the communication ports 21 and 22 of the intermediate communication device 2 before and after the change, for the communication port of which the connection has been changed among the communication port 111 of the upper communication device 11-1 "#A" and the communication port 412 of the lower communication device 41-1 "#C".

FIG. 17 is a diagram illustrating an example of setting change information in the first embodiment. The setting change information illustrated in FIG. 17 corresponds to the connection change from the intermediate communication device 2-1 "#B" to the intermediate communication device 2-2 "#D". The setting change information may include other information on the communication ports 21 and 22 before the change, in addition to the pair of the communication port numbers of the communication ports 21 and 22 of the intermediate communication device 2 before and after the change. For example, the setting change information may include information for identifying a user who is using the communication ports 21 and 22, and information indicating a usage form. Examples of the usage form include encrypted communication and virtual local area network (VLAN).

Step S104

The upper control device 8 supplies the switching device wiring information generated in step S102 to the switching control device 5 as connection change information.

Step S105

The switching device wiring information supplied to the switching control device 5 as the connection change information is received by the interface 51. The interface 51 supplies the switching device wiring information to the wiring possibility determination unit 54. The wiring possibility determination unit 54 determines whether the connection indicated by the switching device wiring information can be changed. When the connection change is possible, the wiring possibility determination unit 54 supplies the switching device wiring information to the wiring instruction unit 55, and proceeds to a process of step S106. When the connection change is not possible, the wiring possibility determination unit 54 notifies the upper control device 8 of a response indicating that the connection change is not possible via the interface 51. When the upper control device 8 receives the response, the upper control device 8 notifies the terminal device 9 of an alarm indicating that the connection change is not possible, and ends the process.

Step S106

The wiring instruction unit 55 compares the switching device wiring information supplied as the connection change information with the switching device wiring information stored in the switching device wiring information storage unit 53, and determines a pair of physical port numbers having a difference in the switching device wiring information to be a connection switching target. The wiring instruction unit 55 supplies an instruction to change the connection to the control port 32 of the switching device 3 based on the difference in the physical port numbers obtained through the comparison and the physical port number determined to be a target. The switching device 3 switches the connection between the physical ports 31 according to the instruction. The response reception unit 56 receives a response indicating the completion of the connection change from the control port 32 of the switching device 3, and notifies the upper control device 8 of the completion of the switching via the interface 51.

Step S107

The upper control device 8 supplies the setting change information generated in step S103 to the communication control device 6.

Step S108

When the communication control device 6 receives the setting change information as an instruction, the communication control device 6 generates the device setting information of the intermediate communication device 2-2 "#D" based on the setting change information. As the generated device setting information, the device setting information of the intermediate communication device 2-1 "#B" connected to the upper network 1 and the lower network 4 before the connection of the physical port 31 is changed is used. For example, when the setting change information illustrated in FIG. 17 is given as an instruction to the communication control device 6, the device setting information used for the communication port 22 "#1" of the intermediate communication device 2-1 "#B" is used as device setting information for the communication port 22 "#1" of the intermediate communication device 2-2 "#D". The communication control device 6 generates device setting information for the intermediate communication device 2-2 "#D" that is used after the connection change from the device setting information used before the connection change of the physical port 31. The communication control device 6 supplies the generated device setting information to the setting port 23 of the intermediate communication device 2-2 "#D" to update the device setting information indicating an operation of the intermediate communication device 2-2 "#D".

Step S109

In line with the change in the intermediate communication device 2 that relays communication from the intermediate communication device 2-1 "#B" to the intermediate communication device 2-2 "#D", the communication control device 6 generates device setting information for the upper communication device 11-1 "#A" and the lower communication device 41-1 "#C". The communication control device 6 supplies the generated device setting information to the setting port 113 of the upper communication device 11-1 "#A" and the setting port 413 of the lower communication device 41-1 "#C" to update the device setting information indicating an operation of each communication device, and ends the process. With this updating, updating of an adjacent device in a routing protocol, a redundancy function, and an operation administration maintenance (OAM) function in the upper communication device 11-1 "#A" and the lower communication device 41-1 "#C", or refreshing of the routing protocol, the redundancy function, and the OAM function is performed. When it is not necessary to update the device setting information of the upper communication device 11-1 "#A" and the lower communication device 41-1 "#C", the communication control device 6 may omit the process of step S109.

As described above, the communication system 110 of the first embodiment switches the connection between the physical ports 31 in the switching device 3 according to a communication status such as a failure of the intermediate communication device 2, a failure of the communication ports 21 and 22, or a change regarding a communication line provided to the user. At least one of a connection between the communication port 22 (upper port) of the intermediate communication device 2 and the upper network 1, and a connection of the communication port 21 (lower port) of the intermediate communication device 2 and the lower network 4 is switched by switching between the physical ports 31. Switching of the intermediate communication device 2 or switching of the communication ports 21 and 22 of the intermediate communication device 2 makes it possible to switch the intermediate communication device 2 that relays the communication between the upper network 1 and the lower network 4 without the engineer going to a place at which the intermediate communication device 2 is installed. According to the communication system 110, it is not necessary to dispatch an engineer to the place at which the intermediate communication device 2 is installed and thus, it is possible to shorten a period of time in which communication interruption occurs while reducing a cost required for the operation of the optical communication network 100.

Further, according to the communication system 110, it is possible to efficiently perform a task of connecting the intermediate communication device 2 and a task of confirming link-up between the upper communication device 11 and the lower communication device 41, by controlling the switching device 3 through a remote operation using the terminal device 9. According to the communication system 110, it is possible to correct a connection error by controlling the switching device 3 through a remote operation using the terminal device 9 even when there is an error in a connection of a new intermediate communication device 2 in a case in which the new intermediate communication device 2 is installed in the central office. According to the communication system 110, it is possible to reduce a burden related to installation of the intermediate communication device 2.

Further, according to the communication system 110, the device setting information of the intermediate communication device 2 is updated according to the change in the connection of the intermediate communication device 2 or the communication ports 21 and 22. Execution of changing the connection between the physical ports 31 using the switching device 3 and updating the device setting information in a batch can reduce the number of tasks performed by the engineer, and shorten a period of time in which communication is not possible due to the change in the connection.

First Modification Example of First Embodiment

In the communication system 110 of the first embodiment, the allocation management unit 71 may generate the allocation information illustrated in FIG. 6 based on the physical wiring information and the switching device wiring information before the switching process is performed. When the upper control device 8 notifies the allocation management unit 71 of the instruction to create the allocation information, the information creation unit 73 is notified of the instruction via the interface 72. The information creation unit 73 requests the upper control device 8 to provide the physical wiring information and the switching device wiring information via the interface 72, and acquires the physical wiring information and the switching device wiring information. The information creation unit 73 acquires the identification information and the communication port number of the upper communication device 11, the intermediate communication device 2, or the lower communication device 41 associated with the physical port number for each pair of physical port numbers included in the switching device wiring information. The information creation unit 73 associates the identification information and the communication port number acquired for each pair of physical port numbers with each other to create allocation information.

An operation in which the information creation unit 73 creates the allocation information will be described with reference to the switching device wiring information illustrated in FIG. 4 and the physical wiring information illustrated in FIG. 8. The information creation unit 73 acquires a pair of physical port numbers "#11" and "#21" from the switching device wiring information. The information creation unit 73 acquires the identification information "AAAA" and the communication port number "#1" associated with the physical port number "#11" from the physical wiring information. Further, the information creation unit 73 acquires the identification information "BBBB" and the communication port number "#1" associated with the physical port number "#21" from the physical wiring information. The information creation unit 73 associates the identification information "AAAA" and the communication port number "#1" that have been acquired with the identification information "BBBB" and the communication port number "#1" that have been acquired and adds these to the allocation information. The information creation unit 73 performs the above-described operation on a pair of physical port numbers "#12" and "#22", a pair of physical port numbers "#41" and "#23", and a pair of physical port numbers "#42" and "#24" to obtain the allocation information illustrated in FIG. 6.

By the allocation management unit 71 creating the allocation information, it is not necessary for the engineer to store the allocation information in the allocation management unit 71 in advance before the switching process, and it is possible to reduce a burden on the engineer. Further, by reducing the number of tasks that are performed by the engineer, it is possible to shorten a time required for the switching process and to shorten the period of time in which communication is not possible. Further, it is possible to reduce occurrence of human error and avoid an unnecessary increase in an operation cost.

Second Embodiment

In the communication system 110 of the first embodiment, it is necessary for the engineer to input the updated allocation information to the terminal device 9. In a communication system of the second embodiment, an allocation management unit generates updated allocation information based on failure information indicating an intermediate communication device 2 or communication ports 21 and 22 in which the failure has occurred. A communication system of the second embodiment differs from the communication system 110 of the first embodiment illustrated in FIG. 1 in a configuration of the allocation management unit. A configuration other than the allocation management unit in the communication system of the second embodiment will be described with reference to the configuration of the communication system 110 of the first embodiment illustrated in FIG. 1.

Figure 18:
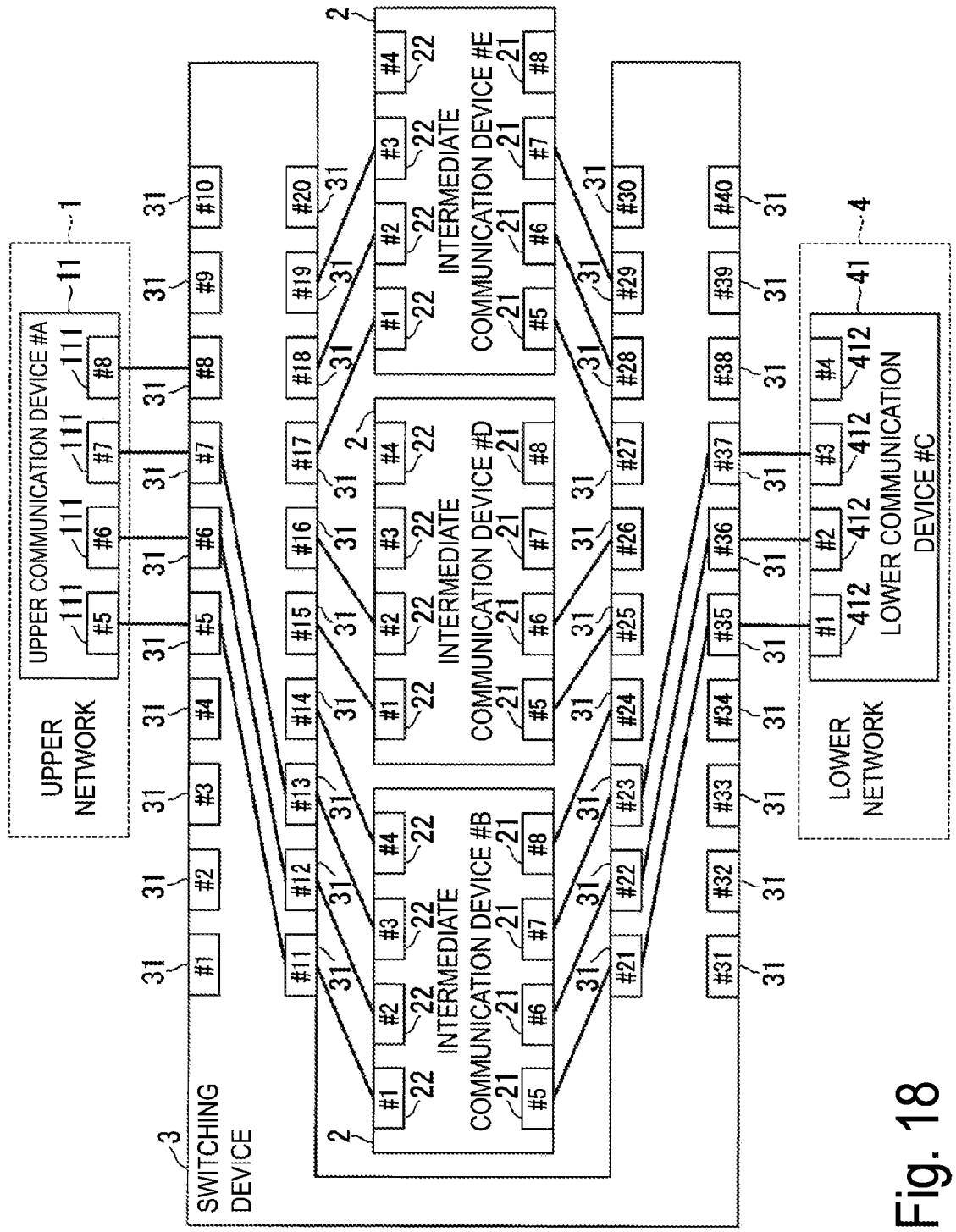
FIG. 18 is a diagram illustrating an example of a connection between a switching device and each of an upper communication device, an intermediate communication device and a lower communication device in a second embodiment.

Hereinafter, a configuration different from that of the communication system 110 of the first embodiment will be described, Here, a connection example illustrated in FIG. 18 is used for detailed description of the connection between a switching device 3 and each of an upper communication device 11, the intermediate communication device 2, and a lower communication device 41. FIG. 18 is a diagram illustrating an example of a connection between the switching device 3 and each of the upper communication device 11, the intermediate communication device 2, and the lower communication device 41 in the second embodiment. In the connection example illustrated in FIG. 18, an upper network 1 includes an upper communication device 11 "#A", a communication system 110 includes intermediate communication devices 2 "#B", "#D", and "#E", and a lower network 4 includes a lower communication device 41 "#C". The upper communication device 11 "#A" includes four communication ports 111 "#5" to "#8". The switching device 3 includes 40 physical ports 31 "#1" to "#40". Each of the intermediate communication device 2. "#B", "#D", and "#E" includes four communication ports 22 "#1" to "#4" and four communication polls 21 "#5" to "#8". The lower communication device 41 "#C" includes four communication ports 412 "#1" to "#4".

Physical ports 31 "#5" to "#7" are connected to the communication ports 111 "#5" to "#7" of the upper communication device 11 "#A", respectively. Physical ports 31 "#11" to "#14" are connected to the communication ports 22 "#1" to "#4" of the intermediate communication device 2 "#B", respectively. Physical ports 31 "#15" and "#16" are connected to the communication ports 22 "#1" and "#2" of the intermediate communication device 2 "#D", respectively. Physical ports 31 "#17" to "#19" are connected to the communication ports 22 "#1" to "#3" of the intermediate communication device 2 "#E", respectively. Physical ports 31 "#21" to "#24" are connected to the communication ports 21 "#5" to "#8" of the intermediate communication device 2 "#B", respectively. Physical ports 31 "#25" and "#26" are connected to the communication ports 21 "#5" and "#6" of the intermediate communication device 2 "#D", respectively. Physical ports 31 "#27" to "#29" are connected to the communication ports 21 "#5" to "#7" of the intermediate communication device 2 "#E", respectively, Physical ports 31 "#35" to "#37" are connected to the communication ports 412 "#1" to "43" of the lower communication device 41 "IC", respectively.

In the switching device 3, the physical ports 31 "#5" to "#7" are connected to the physical ports 31 "#11" to "#13", respectively. The physical ports 31 "#21" to "#23" are connected to the physical ports 31 "#35" to "#37", respectively. The connection between the physical ports 31 in the switching device 3 can be switched under the control of a switching control device 5 as described in the first embodiment.

FIG. 19 is a diagram illustrating an example of switching device wiring information in the second embodiment. The switching device wiring information illustrated in FIG. 19 indicates a connection between the physical ports 31 in the connection example illustrated in FIG. 18. As illustrated in FIG. 19, the switching device wiring information includes a pair of physical port numbers "#5" and "#11", a pair of physical port numbers "#6" and "#12", a pair of physical port numbers "#7" and "#13", a pair of physical port numbers "#21" and "#35", a pair of physical port numbers "#22" and "#36", and a pair of physical port numbers "#23" and "#37". That is, the switching device wiring information indicates that the physical ports 31 "#5", "#6", "#7", "#21", "#22", and "#23" are connected to the physical ports 31 "#11", "#12", "#13", "#35", "#36", and "#37", respectively, FIG. 20 is a diagram illustrating an example of physical wiring information in the second embodiment. The physical wiring information illustrated in FIG. 20 indicates a connection between the switching device 3 and each of the upper communication device 11, the intermediate communication device 2, and the lower communication device 41 in the connection example illustrated in FIG. 18. Empty information (NULL) is associated with the physical port number indicating the physical port to which none of the devices is connected. In the physical wiring information illustrated in FIG. 20, serial numbers "AAAA", "BBBB", "CCCC", "DDDD", and "EFEE" are used as identification information of the upper communication device 11 "#A", the intermediate communication devices 2 "#B", "#D", and "#E", and the lower communication device 41 "#C", respectively. Further, "#1" to "#8" are used as communication port numbers indicating the communication ports of the communication device, and "#1" to "#40" are used as the physical port numbers indicating the physical ports 31.

As illustrated in FIG. 20, the physical wiring information indicating the connection example illustrated in FIG. 18 indicates that the physical port 31 "#5" corresponds to the communication port 111 "#5" of the upper communication device 11 "#A" and indicates that these ports are connected. Communication device information for identifying the connected communication ports is associated with physical port numbers of the other physical ports 31 "#6", "#7", "#11" to "#19", "#21" to "#29", and "#35" to "#37". Thus the physical wiring information indicates the connection between the respective ports.

Figure 21:
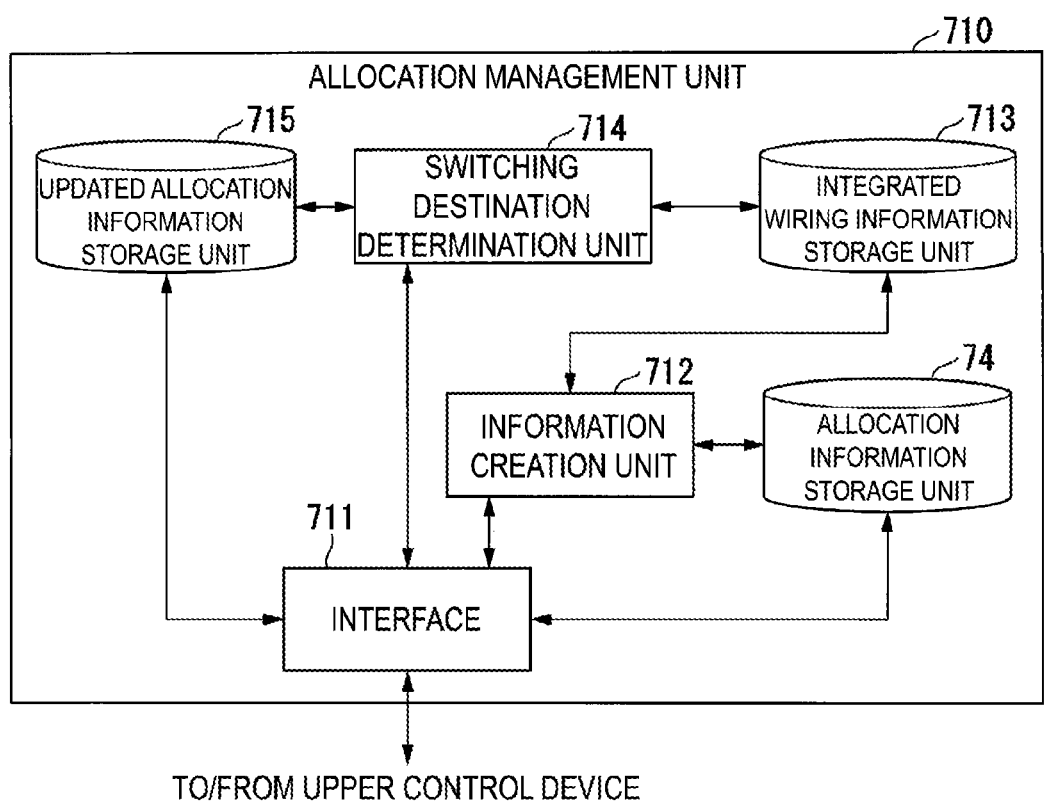
FIG. 21 is a block diagram illustrating a configuration example of an allocation management unit according to the second embodiment.

FIG. 21 is a block diagram illustrating a configuration example of an allocation management unit 710 according to the second embodiment. The allocation management unit 710 includes an interface 711, an information creation unit 712, an integrated wiring information storage unit 713, a switching destination determination unit 714 (switching destination determiner), and an updated allocation information storage unit 715. The interface 711 receives an instruction for a request for or update of allocation information from the upper control device 8. Further, the interface 711 receives an instruction to generate integrated wiring information and an instruction to generate updated allocation information from the upper control device 8. When the interface 72 receives the instruction for a request for the allocation information, the interface 72 reads the allocation information stored in the allocation information storage unit 74 and supplies the read allocation information to the upper control device 8.

When the interface 711 receives an instruction to update the allocation information, the interface 711 notifies the information creation unit 712 of the instruction to update the allocation information. When the information creation unit 712 receives the instruction to update the allocation information, the information creation unit 712 requests the upper control device 8 to provide the switching device wiring information and the physical wiring information via the interface 711. The interface 711 supplies the switching device wiring information and the physical wiring information received as a response to the request to the information creation unit 712. The information creation unit 712 creates the allocation information based on the switching device wiring information and the physical wiring information, and updates the allocation information stored in the allocation information storage unit 74 with the created allocation information.

When the interface 711 receives an instruction to generate the integrated wiring information, the interface 711 notifies the information creation unit 712 of the instruction to generate the integrated wiring information. When the information creation unit 712 receives the instruction to generate the integrated wiring information, the information creation unit 712 requests the upper control device 8 to provide the switching device wiring information and the physical wiring information via the interface 711. The interface 711 supplies the switching device wiring information and the physical wiring information received as a response to the request to the information creation unit 73. The information creation unit 73 creates the integrated wiring information based on the switching device wiring information and the physical wiring information, and stores the created integrated wiring information in the integrated wiring information storage unit 713.

When the interface 711 receives the instruction to generate the updated allocation information, the interface 711 notifies the switching destination determination unit 714 of the instruction to generate the updated allocation information. When the switching destination determination unit 714 receives the instruction to generate the updated allocation information, the switching destination determination unit 714 acquires the failure information via the interface 711. The failure information indicates a failure of the intermediate communication device 2 or a failure of the communication ports 21 and 22 of the intermediate communication device 2. The switching destination determination unit 714 generates updated allocation information based on the acquired failure information and the integrated wiring information stored in the integrated wiring information storage unit 713. The switching destination determination unit 714 stores the generated updated allocation information in the updated allocation information storage unit 715. Further, the switching destination determination unit 714 supplies the updated allocation information to the upper control device 8 via the interface 711. The switching destination determination unit 714 generates updated allocation information indicating a change in allocation for achieving recover from the failure based on the failure information indicating the failure in the intermediate communication device 2 and the integrated wiring information indicating the allocation of the intermediate communication device 2 that relays the communication in the communication system 110.

FIG. 22 is a diagram illustrating an example of the integrated wiring information in the second embodiment. The integrated wiring information is obtained by adding information indicating the connection between the physical ports 31 indicated by the switching device information to the physical wiring information. The integrated wiring information includes a physical port number indicating another physical port connected to each physical port as a connection destination physical port number. That is, in the integrated wiring information, the connection destination physical port number and the communication device information are associated with the physical port number of each physical port 31. Empty information (NULL) is associated with the physical port number indicating the physical port 31 that is not connected to the other physical port 31 as a connection destination physical port number.

In the integrated wiring information indicating the connection example illustrated in FIG. 18, the connection destination physical port number "#11" and communication device information indicating the upper communication device 11 "#A" and the communication port 111 "#5" are associated with the physical port number "#5", as illustrated in FIG. 22. This correspondence indicates that the physical port 31 "#3" is connected to the upper communication device 11 "#A" and the communication port 111 "#5", and the physical port 31 "#3" in the switching device 3 is connected to the physical port 31 "#11". The connection destination physical port number and the communication device information for identifying the connected communication port are associated with the physical port number of the other physical ports 31 "#6", "#7", "#11" to "#19", "#21" to "#29", and "#35" to "#37". This correspondence indicates each connection.

Figure 23:
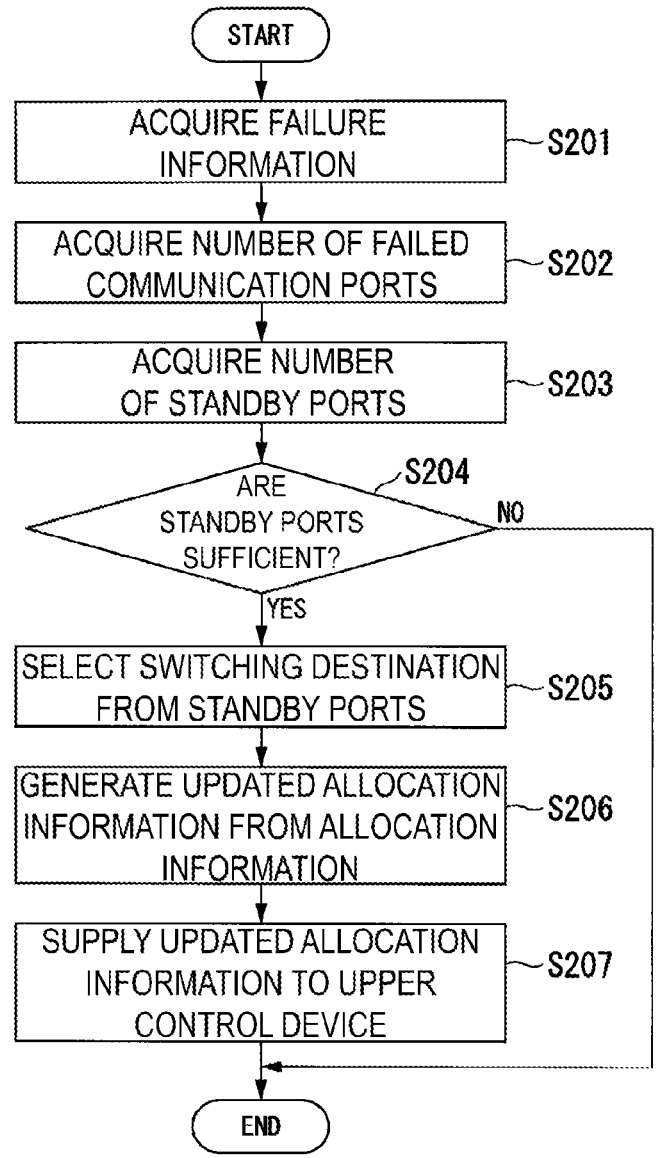
FIG. 23 is a flowchart illustrating an operation in a process in which the allocation management unit in the second embodiment generates updated allocation information.

FIG. 23 is a flowchart illustrating an operation (steps S201 to S207) in a process in which the allocation management unit 710 in the second embodiment generates updated allocation information. When the engineer is notified that a failure has occurred in the intermediate communication device 2 or the communication ports 21 and 22 of the intermediate communication device 2, the engineer inputs failure information including information indicating occurrence of the failure and information for specifying the failed intermediate communication device 2 or communication ports 21 and 22 to the terminal device 9. When the allocation management unit 710 receives the failure information via the upper control device 8, a process of generating the updated allocation information is started.

Step S201

The interface 711 notifies the switching, destination determination unit 714 of the failure information supplied via the upper control device 8 as an instruction to generate updated allocation information.

Step S202

The switching destination determination unit 714 acquires the number of communication ports that cannot perform communication due to a failure from the failure information or the failure information and the integrated wiring information. When the failure information indicates a failure of the communication ports 21 and 22 of the intermediate communication device 2, the switching destination determination unit 714 acquires the number of communication ports 21 and 22 indicated by the failure information as the number of failed communication ports. When the failure information indicates a failure of the intermediate communication device 2, the switching destination determination unit 714 refers to the integrated wiring information and acquires, as the number of failed communication ports, the number of communication ports 21 and 22 used for relaying of communication among the communication ports 21 and 22 of the intermediate communication device 2 indicated by the failure information. The switching destination determination unit 714 acquires the number of failed communication ports for each of the communication port 22 and the communication port 21. That is, the switching destination determination unit 714 treats the communication port 22 (upper port) used for communication with the upper communication device 11 and the communication port 21 (lower port) used for communication with the lower communication device 41 as different communication ports.

Step S203

The switching destination determination unit 714 refers to the integrated wiring information and acquires the number of communication ports 21 and 22 that are not used for relaying of communication among the communication ports 21 and 22 connected to the switching device 3. The switching destination determination unit 714 acquires the number of communication ports 21 and 22 are not used for relaying of communication, that is, standby ports.

Step S204

The switching destination determination unit 714 compares the number of failed communication ports with the number of standby ports and determines whether there are sufficient relay switching destinations allocated to the failed communication ports. The switching destination determination unit 714 also compares the number of communication ports with the number of standby ports for each of the communication ports 22 and 21. When the number of standby ports is equal to or larger than the number of failed communication ports, the switching destination determination unit 714 proceeds to a process of step S205. When the number of standby ports is smaller than the number of failed communication ports, the switching destination determination unit 714 determines that recovery from the failure is not possible, notifies the upper control device 8 or the terminal device 9 of an alarm indicating that the connection change is not possible, and ends the process.

Step S205

The switching destination determination unit 714 refers to the integrated wiring information and determines the switching destination for each of the failed communication ports 22 and 21 from among specified standby ports. The switching destination determination unit 714 may apply the following selection as a reference for selection of the switching destination from the standby port.

When the failure information indicates a failure of the communication ports 22 and 21 and the intermediate communication device 2 having the failed communication port has a standby port, the switching destination determination unit 714 selects the standby port. When the intermediate communication device 2 having a plurality of standby ports, the switching destination determination unit 714 selects the standby port having a smallest communication port number.

When the intermediate communication device 2 having the failed communication port does not have a standby port and a plurality of intermediate communication devices 2 have standby ports, the switching destination determination unit 714 selects the standby port of the intermediate communication device 2 having smallest identification information (serial number). When the intermediate communication device 2 having the smallest identification information has a plurality of standby ports, the switching destination determination unit 714 selects the standby port having the smallest communication port number.

When the failure information indicates a failure of the intermediate communication device 2, the switching destination determination unit 714 selects a standby port so that the number of the intermediate communication devices 2 that are switching destinations is the smallest. When there are a plurality of selections of standby ports that minimize the number of intermediate communication devices 2 that are switching destinations, the switching destination determination unit 714 selects the standby port of the intermediate communication device 2 having the smallest identification information (serial number).

Step S206

The switching destination determination unit 714 reads the allocation information from the allocation information storage unit 74. The switching destination determination unit 714 changes the communication device information including the communication port numbers of the failed communication ports 22 and 21 in the read allocation information to communication device information including the physical port number of the standby port selected as the switching destination. The switching destination determination unit 714 stores the allocation information in which the communication device, information has been changed in the updated allocation information storage unit 715 as the updated allocation information.

Step S207

The switching destination determination unit 714 supplies the allocation information in the communication device information has been changed as the updated allocation information to the upper control device 8 via the interface 711, and ends the process. When the upper control device 8 receives the updated allocation information, the upper control device 8 executes the switching process illustrated in FIG. 14 to perform recovery from communication interruption caused by the failure.

Hereinafter, two specific cases for generating updated allocation information in the communication system of the second embodiment will be described with reference to the connection example illustrated in FIG. 18 and the integrated connection information illustrated in FIG. 22.

First Case

An operation of the communication system when a failure occurs in the communication port 22 "#3" of the intermediate communication device 2 "#B" in the connection example illustrated in FIG. 18 will be described. Failure information indicating that the communication port 22 "#3" of the intermediate communication device 2 "#B" has failed is input to the terminal device 9 by an engineer. The switching destination determination unit 714 acquires the failure information via the upper control device 8 and the interface 711 (corresponding to step S201). The switching destination determination unit 714 acquires the number "1" of the failed communication ports 22 from the failure information (corresponding to step S202). The switching destination determination unit 714 refers to the integrated wiring information and acquires the number "6" of standby ports that are candidates for the switching destination of the failed communication port 22 "#3" (corresponding to step S203). In the integrated wiring information illustrated in FIG. 22, the standby ports among the communication ports 22 of the intermediate communication devices 2 "#B", "#D", and "#E" are the communication port 22 "#14" of the intermediate communication device 2 "#B", the communication ports 22 "#1" and "#2" of the intermediate communication device "#D", and the communication polls 22 "#1" to "#3" of the intermediate communication device "#E".

The standby port is specified through a determination as to whether the connection destination physical port number is associated with the physical port number with which the communication device information is associated in the integrated wiring information. By performing this determination, the switching destination determination unit 714 specifies the six communication ports 22 described above and acquires the number of the specified communication ports 22 as the number of standby ports.

The switching destination determination unit 714 determines that the number of standby ports is equal to or larger than the number of failed communication ports 22 (corresponding to step S204). The switching destination determination unit 714 selects the communication port 22 "#14" of the intermediate communication device 2 "#B" as a standby port that is a switching destination from the standby ports according to the above-described reference (corresponding to step S205). The switching destination determination unit 714 reads the allocation information. The switching destination determination unit, rewrites the communication device information indicating the failed communication port 22 using the communication device information indicating the selected standby port to change the allocation information (corresponding to step S206). The switching destination determination unit 714 supplies the changed allocation information to the upper control device 8 as updated allocation information (corresponding to step S207). The upper control device 8 performs a switching process based on the updated allocation information, and switches the connection destination of the physical port 31 "#7" in the switching device 3 from the physical port 31 "#13" to the physical port 31 "#14". By this switching, recovery can be achieved from the communication interruption caused by the failure of the communication port 22 "#3" of the intermediate communication device 2 "#13".

FIG. 24 is a diagram illustrating allocation information and updated allocation information in a case in which recovery is performed from a failure of a first case in the second embodiment. Communication device information including the identification information "BBBB" and the communication port number "#3" of the allocation information is changed to communication device information including the identification information "BBBB" and the communication port number "#4" in the updated allocation information.

Second Case

An operation of the communication system when a failure occurs in the intermediate communication device 2 "#B" in the connection example illustrated in FIG. 18 will be described. Information indicating that a failure has occurred in the intermediate communication device 2 "#B" is input to the terminal device 9 by an engineer. The switching destination determination unit 714 acquires failure information via the upper control device 8 and the interface 711 (corresponding to step S201). The switching destination determination unit 714 acquires the number "3" of the failed communication ports 22 and the number "3" of the failed communication ports 21 from the failure information (corresponding to step S202). The switching destination determination unit 714 refers to the integrated wiring information and acquires the number "5" of standby ports that are candidates for switching destinations of the failed communication ports 22 "#1" to "#3" (corresponding to step S203). Further, the switching destination determination unit 714 refers to the integrated wiring information and acquires the number "5" of standby ports that are candidates for switching destinations of the failed communication ports 21 "#5" to "#7" (corresponding to step S203).

In the integrated wiring information illustrated in FIG. 22, the standby ports among the communication ports 22 of the intermediate communication devices 2 "#D" and "#E are the communication port 22 "#1" and "#2" of the intermediate communication device "#D" and communication ports 22 "#1" to "#3" of the intermediate communication device "#E". Among the communication ports 21 of the intermediate communication device 2 "#D" and "#E", the standby ports are the communication ports 21 "#5" and "#6" of the intermediate communication device "#D" and the communication ports 22 "#5" to "#7" of the intermediate communication device "#E".

The switching destination determination unit 714 determines that the number of standby ports is equal to or larger than the number of failed communication ports 22 (corresponding to step S204). The switching destination determination unit 714 selects the communication ports 22 "#1" to "#3" and the communication ports 21 "#5" to "#7" of the intermediate communication device 2 "#E" as standby ports of the switching destinations according to the above-described reference (corresponding to step S205). The switching destination determination unit 714 reads the allocation information. The switching destination determination unit rewrites the communication device information indicating the failed communication port 22 using the communication device information indicating the selected standby port to change the allocation information (corresponding to step S206). The switching destination determination unit 714 supplies the changed allocation information to the upper control device 8 as updated allocation information (corresponding to step S207). The upper control device 8 executes the switching process based on the updated allocation information, and switches connection destinations of the physical ports 31 "#5" to "#7" in the switching device 3 from the physical ports 31 "#11" to "#13" to the physical ports 31 "#17" to "#19". Further, the upper control device 8 switches connection destinations of the physical ports 31 "#35" to "#37" in the switching device 3 from the physical ports 31 "#21" to "#23" to the physical ports 31 "#27" to "#29". By this switching, recovery can be achieved from the communication interruption caused by the failure of the intermediate communication device 2 "#B".

FIG. 25 illustrates information indicating allocation information and updated allocation information in a case in which recovery is achieved from a failure of a second case in the second embodiment is performed. Communication device information including the identification information "BBBB" in the allocation information is changed to communication device information including the identification information "EEEE" in the updated allocation information.

Figure 26:
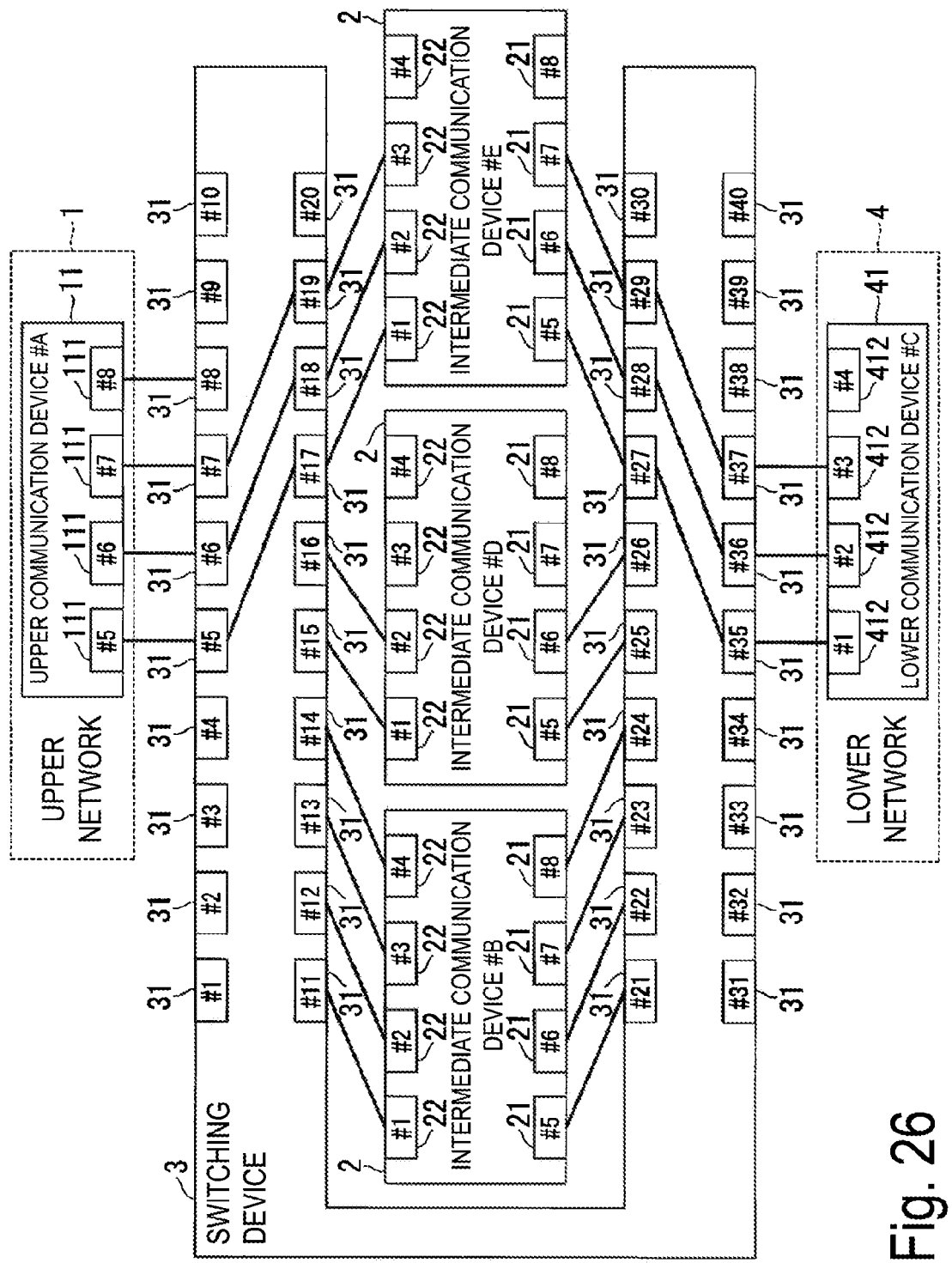
FIG. 26 is a diagram illustrating an example of a connection between a switching device and each of the upper communication device, the intermediate communication device, and the lower communication device after recovery is applied from the failure of the second case in the second embodiment.

FIG. 26 is a diagram illustrating an example of a connection between the switching device 3 and each of the upper communication device 11, the intermediate communication device 2 and the lower communication device 41 after recovery is applied from the failure of the second case in the second embodiment. In the switching device 3, the connection destinations of the physical ports 31 "#5" to "#7" are switched from the physical ports 31 "#11" to "#13" to the physical ports 31 "#17" to "#19". Further, the connection destinations of the physical ports 31 "#35" to "#37" are switched from the physical ports 31 "#21" to "#23" to the physical ports 31 "#27" to "#29".

As described above, in the communication system of the second embodiment, the allocation management unit 710 creates the updated allocation information. The upper control device 8 performs a switching process for changing the switching of the connection of the physical port 31 in the switching device 3 based on the created updated allocation information. According to the communication system of the second embodiment, the engineer may input the failure information indicating the intermediate communication device 2 or the communication ports 22 and 21 in which the failure has occurred to the terminal device 9 without creating the updated allocation information, and the burden on the engineer is reduced. Further, in the communication system of the second embodiment, the creation of the updated allocation information by the engineer is omitted such that a time required for recovery from the failure can be shortened. Further, it is possible to reduce occurrence of human error and avoid an unnecessary increase in an operation cost.

The communication system described in the first and second embodiments may be applied to an access network using a passive optical network (PON). In this case, the upper network 1 may include a relay device as the upper communication device 11, the communication system 110 may include an accommodation device, an optical subscriber line end station device, or an optical line terminal (OLT) as the intermediate communication device 2, and the lower network 4 may include an optical termination device or an optical network unit (ONU) as the lower communication device 41.

Figure 27:
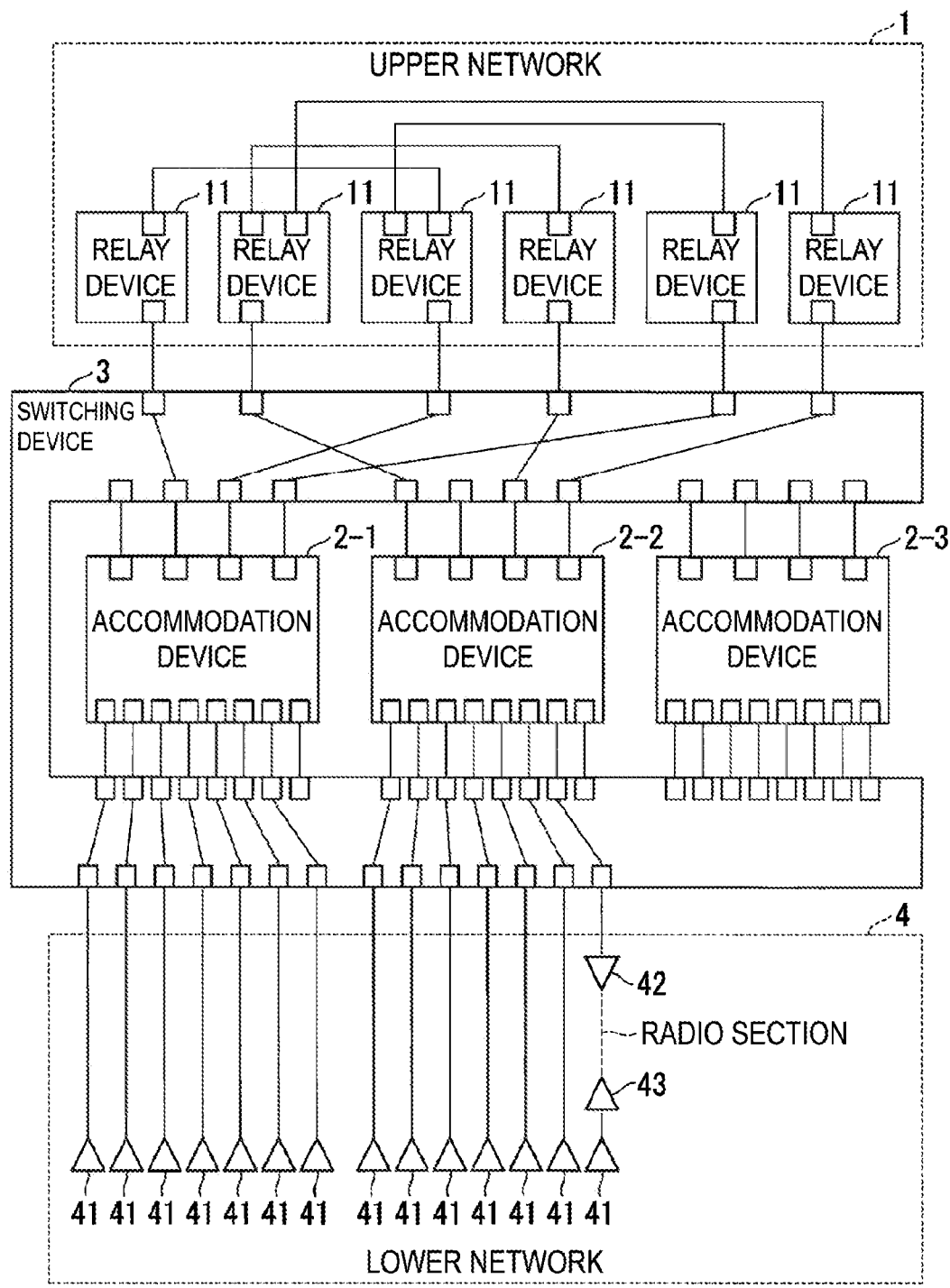
FIG. 27 illustrates a connection example in a case in which the communication system of the first or second embodiment is applied to an access network using a PON.

FIG. 27 is a diagram illustrating a connection example in a case in which the communication system 110 of the first or second embodiment is applied to an access network using PON. In the connection example illustrated in FIG. 27, the upper network 1 includes six relay devices connected to each other as the upper communication device 11. The communication system 110 includes three accommodation devices having four communication ports (upper ports) on the upper network 1 side and eight communication ports (lower ports) on the lower network 4 side as the intermediate communication device 2 (2-1, 2-2, and 2-3). The lower network 4 includes 14 ONUs as the lower communication device 41. As illustrated in the connection example, the lower network 4 may include a radio section in a communication path to the ONU 41. When a radio section is included in a communication path between the ONU 41 and the switching device 3, the lower network 4 includes signal conversion devices 42 and 43 that perform a conversion from an optical signal to a radio signal and a conversion from a radio signal to an optical signal. The ONU 41 and the signal conversion device 43 may be configured as an integrated device. Further, the lower network 4 may include a communication section in which an electrical signal has been used in the communication path between the ONU 41 and the switching device 3. The lower network 4 includes a signal conversion device even when the communication section in which an electrical signal has been used is included. Each physical port of the switching device 3 is connected to a communication port of each of the relay device 11, the accommodation device 2, and the ONU 41. The switching device 3 connects three upper ports of the respective accommodation devices 2-1 and 2-2 to the relay device 11, and connects seven lower ports of the respective accommodation devices 2-1 and 2-2 to the ONU 41.

In the connection example illustrated in FIG. 27, the upper port of each of the accommodation devices 2-1 and 2-2 not connected to the relay device 11 is treated as a standby port. The lower port of each of the accommodation devices 2-1 and 2-2 not connected to the ONU 41 is also treated as a standby port. The accommodation device 2-3 not connected to the relay device 11 and the ON U 41 is treated as a standby device. When a failure occurs in the communication port of the accommodation device 2-1 or the accommodation device 2-2, the switching device 3 switches a connection to the communication port in which the failure has occurred to a standby port under the control of the switching control device 5. By this switching, recovery can be achieved from communication interruption. The connection switching in the switching device 3 is performed for one or both of the upper port connection and the lower port connection.

When a failure occurs in a plurality of communication ports, or when a failure occurs in the accommodation device 2-1 or the accommodation device 2-2, the switching device 3 connects the communication port of the accommodation device 2-3 provided as a standby device to the relay device 11 and the ONU 41 under the control of the switching control device 5. The communication system 110 uses the accommodation device 2-3 as a standby device for communication to achieve recovery from communication interruption. In the connection example illustrated in FIG. 27, the three communication ports of the accommodation device 2 used for communication are connected to the relay device 11, and triple redundancy can be achieved in the connection between the accommodation device 2 and the relay device 11.

Further, in the communication system described in the first and second embodiments, the switching device 3 may connect a plurality of communication ports 111 of the upper communication device 11 to a plurality of communication ports 22 (upper ports) of the intermediate communication device 2. By securing a plurality of connections between the communication port 111 and the communication port 22, it is possible to achieve double, or triple or more redundancy in the connection between the intermediate communication device 2 and the upper network 1. By performing triple or more redundancy in the connection between the intermediate communication device 2 and the upper network 1, it is possible to maintain redundancy even when a failure occurs in the intermediate communication device 2 or the intermediate communication device 2 is updated or replaced.

Further, in the communication system described in the second embodiment, when the intermediate communication device 2 has a function of detecting a failure of the device, the intermediate communication device 2 may notify the upper control device 8 of the detected failure. By the intermediate communication device 2 notifying the upper control device 8 of the failure, the communication system can achieve recovery from the failure without the engineer operating the terminal device 9. Thus, the communication system can further reduce the burden on the engineer and further shorten the time required for recovery from a failure. Failure information indicating the failure of which the intermediate communication device 2 notifies the upper control device 8 may include identification information for specifying the intermediate communication device 2 or communication device information capable of specifying the communication ports 21 and 22 in which the failure has occurred.

In the description of the first and second embodiments, the case in which the switching control device 5, the communication control device 6, the network management device 7, and the upper control device 8 are provided as independent devices has been described. However, these devices may be provided as one device such as a control device. Further, the switching control device 5, the communication control device 6, the network management device 7, and the upper control device 8 may include a central processing unit (CPU), a memory, an auxiliary storage device, and the like connected by a bus, and the CPU may execute a program to perform a switching process, a process of generating the allocation information, and a process of generating the updated allocation information. The CPU may execute a program stored in the auxiliary storage device to perform some or all of operations of the switching control device 5, the communication control device 6, the network management device 7, and the upper control device 8. Further, all or some of the operations in the switching control device 5, the communication control device 6, the network management device 7, and the upper control device 8 may be implemented as hardware including an electronic circuit (or electronic circuitry) using an application specific integrated circuit (ASIC), a programmable logic device (PLD), a field programmable gate array (FPGA), or the like. The program may be recorded on a computer-readable recording medium. The computer-readable recording medium is, for example, a flexible disk, a magneto-optical disc, a portable medium such as a ROM or a CD-ROM, or a non-transitory storage medium such as a storage device such as a hard disk built in a computer system. The program may be transmitted over a telecommunication line.

Although the embodiments of the present disclosure have been described in detail with reference to the drawings, a specific configuration is not limited to the embodiments, and includes designs or the like without departing from the gist of the present disclosure.

INDUSTRIAL APPLICABILITY

The present disclosure is applicable to optical communication networks or the like.

REFERENCE SIGNS LIST

1: Upper network
2: Intermediate communication device
3: Switching device
4: Lower network
5: Switching control device
6: Communication control device
7: Network management device
8: Upper control device
9: Terminal device
11: Upper communication device
12: Communication line
21, 22: Communication port
23: Setting port
31: Physical port
32: Control port
41: Lower communication device
51: Interface
52: Wiring information acquisition unit
53: Switching device wiring information storage unit
54: Wiring possibility determination unit
55: Wiring instruction unit
56: Response reception unit
57: Wiring information updating unit
71: Allocation management unit
72: Interface
73: Information creation unit
74: Allocation information storage unit
75: Physical wiring management unit
76: Interface
77: Physical wiring information acquisition unit
78: Physical wiring information updating unit
79: Physical wiring information storage unit
100: Optical communication network
110: Communication system
111, 112: Communication port
113: Setting port
411, 412: Communication port
413: Setting port
710: Allocation Management unit
711: interface
712: information creation unit
713: Integrated wiring information storage unit
714: Switching destination determination unit
715: Updated allocation information storage unit

The invention claimed is:

1. A communication system connected to an upper network and a lower network, the communication system comprising:
at least one intermediate communication device including a plurality of upper ports configured to input and output optical signals to and from the upper network, and a plurality of lower ports configured to input and output optical signals to and from the lower network, the at least one intermediate communication device being configured to relay communication between the upper network and the lower network;
a switching device connected to the upper network, the lower network, the plurality of upper ports, and the plurality of lower ports, the switching device being configured to switch a connection between the upper network and the plurality of upper ports and a connection between the lower network and the plurality of lower ports; and
a control device configured to output, to the switching device, an instruction to switch at least one of the connection between the upper network and the plurality of upper ports or the connection between the lower network and the plurality of lower ports according to a communication status between the upper network and the lower network,
wherein, when the connection between the lower network and the plurality of lower ports is switched, the control device selects at least one lower port, from among the plurality of lower ports, not connected to the lower network, and outputs, to the switching device, the instruction to switch a connection destination of the lower network connected to a lower port identified by the communication status in the plurality of lower ports to the at least one lower port that is selected,
wherein each of the intermediate communication device, the switching device, and the control device is implemented by:
i) computer executable instructions executed by at least one processor,
ii) at least one circuitry or
iii) a combination of computer executable instructions executed by at least one processor and at least one circuitry.

2. The communication system according to claim 1, wherein the control device performs, according to the instruction, at least one of switching for connecting the upper port not connected to the upper network among the plurality of upper ports of the at least one intermediate communication device connected to the upper network and the lower network to the upper network or switching for connecting the lower port not connected to the lower network among the plurality of lower ports of the at least one intermediate communication device connected to the upper network and the lower network to the lower network.

3. The communication system according to claim 1, wherein the at least one intermediate communication device comprises a plurality of intermediate communication devices, and
the control device switches, according to the instruction, an intermediate communication device of the plurality of intermediate communication devices connected to the upper network and the lower network to another intermediate communication device among the plurality of intermediate communication devices.

4. The communication system according to claim 1, wherein the at least one intermediate communication device comprises a plurality of intermediate communication devices, and
the control device disconnects the plurality of upper ports and the plurality of lower ports of an intermediate communication device of the plurality of intermediate communication devices connected to the upper network and the lower network and connects an upper port and a lower port of another intermediate communication device of the plurality of intermediate communication devices to the upper network and the lower network according to the instruction.

5. The communication system according to claim 1, wherein, when the control device receives failure information indicating a failure of any of the intermediate communication device, the plurality of upper ports, and the plurality of lower ports, the control device outputs the instruction to switch a connection to the switching device.

6. The communication system according to claim 1, wherein, when the control device receives a change in a request for communication between the upper network and the lower network, the control device outputs the instruction to switch a connection to the switching device.

7. The communication system according to claim 1,
wherein the switching device and the control device are installed in a central office accommodating a communication line to the lower network, and
the control device receives status information indicating the communication status between the upper network and the lower network from outside the central office.

8. The communication system according to claim 1, comprising:
a communication control device configured to change setting information indicating an operation of the intermediate communication device according to a change in connection by the switching device.

9. The communication system according to claim 1, wherein the control device outputs the instruction to switch a connection to the switching device based on switching device wiring information indicating any one or both of a connection between the upper network and the plurality of upper ports by the switching device and a connection between the lower network and the plurality of lower ports by the switching device.

10. The communication system according to claim 1, further comprising:
a network manager configured to
store allocation information indicating an upper port that the intermediate communication device uses for communication with the upper network and a lower port that the intermediate communication device uses for communication with the lower network,
acquire, in a case in which at least one of an upper port that the intermediate communication device uses for communication with the upper network or a lower port that the intermediate communication device uses for communication with the lower network is changed, updated allocation information indicating an upper port that the intermediate communication device uses for communication with the upper network and a lower port that the intermediate communication device uses for communication with the lower network,
generate connection change information including an instruction to switch at least one of a connection between the upper network and the plurality of upper ports in the switching device or a connection between the lower network and the plurality of lower ports in the switching device based on physical wiring information indicating a connection between a plurality of physical ports of the switching device and the upper network, the intermediate communication device, and the lower network, and the updated allocation information that is acquired, and output the connection change information to the switching device, and
update setting information indicating an operation of the intermediate communication device based on the allocation information and the updated allocation information.

11. The communication system according to claim 10, further comprising:
a switching destination determiner configured to generate the updated allocation information based on switching device wiring information indicating a connection between the upper network and the plurality of upper ports by the switching device and a connection between the lower network and the plurality of lower ports by the switching device, the physical wiring information, and the communication status.

12. The communication system according to claim 1,
wherein the upper network includes a relay device,
the intermediate communication device is an accommodation device,
the lower network includes an optical termination device (ONU), and
the switching device switches at least one of a connection between the relay device and an upper port of the accommodation device or a connection between a lower port of the accommodation device and the optical termination device.

13. The communication system according to claim 1, wherein the switching device connects the plurality of upper ports of the intermediate communication device to the upper network.

14. The communication system according to claim 1,
wherein the at least one intermediate communication device comprises three or more intermediate communication devices, and
at least one or more intermediate communication devices among the three or more intermediate communication devices are included as standby devices not connected to the upper network and the lower network.

15. A control method in a communication system including at least one intermediate communication device including a plurality of upper ports configured to input and output optical signals to and from an upper network, and a plurality of lower ports configured to input and output optical signals to and from a lower network, the at least one intermediate communication device being configured to relay communication between the upper network and the lower network, and a switching device connected to the upper network, the lower network, the plurality of upper ports, and the plurality of lower ports, the switching device connecting the upper network to the plurality of upper ports and connecting the lower network to the plurality of lower ports, the communication system being connected to the upper network and the lower network, the control method comprising:
selecting, when a connection between the lower network and the plurality of lower ports is switched, at least one lower port, from among the plurality of lower ports, not connected to the lower network; and
outputting to the switching device, an instruction to switch a connection destination of the lower network connected to a lower port identified by a communication status in the plurality of lower ports to the at least one lower port that is selected.

16. A communication system connected to an upper network and a lower network, the communication system comprising:
a plurality of intermediate communication devices including a plurality of upper ports configured to input and output optical signals to and from the upper network, and a plurality of lower ports configured to input and output optical signals to and from the lower network, the plurality of intermediate communication devices being configured to relay communication between the upper network and the lower network;
a switching device connected to the upper network, the lower network, the plurality of upper ports, and the plurality of lower ports, the switching device being configured to switch a connection between the upper network and the plurality of upper ports and a connection between the lower network and the plurality of lower ports; and
a control device configured to output, to the switching device, an instruction to switch at least one of the connection between the upper network and the plurality of upper ports or the connection between the lower network and the plurality of lower ports according to a communication status between the upper network and the lower network,
wherein, when the connection between the lower network and the plurality of lower ports is switched, the control device selects at least one intermediate communication device, from among the plurality of intermediate communication devices, not connected to the lower network, and outputs, to the switching device, the instruction to switch a connection destination of the lower network connected to a lower port identified by the communication status in the plurality of lower ports to any one of the plurality of lower ports included in the at least one intermediate communication device that is selected,
wherein each of the plurality of intermediate communication devices, the switching device, and the control device are implemented by:
i) computer executable instructions executed by at least one processor,
ii) at least one circuitry or
iii) a combination of computer executable instructions executed by at least one processor and at least one circuitry.

* * * * *